(12) United States Patent
Yamauchi

(10) Patent No.: US 8,482,682 B2
(45) Date of Patent: Jul. 9, 2013

(54) DISPLAY SYSTEM, SCREEN AND PROJECTOR WITH LIGHT ABSORPTION LAYER AND PHOTOCONDUCTIVE LAYER

(75) Inventor: Taisuke Yamauchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 324 days.

(21) Appl. No.: 12/891,975

(22) Filed: Sep. 28, 2010

(65) Prior Publication Data

US 2011/0085095 A1 Apr. 14, 2011

(30) Foreign Application Priority Data

Oct. 8, 2009 (JP) ................................. 2009-234286

(51) Int. Cl.
*G02F 1/1335* (2006.01)
*G02F 1/1333* (2006.01)
*C09K 19/02* (2006.01)
*G03B 21/26* (2006.01)
*G03B 21/56* (2006.01)

(52) U.S. Cl.
USPC ............ 349/7; 349/5; 349/8; 349/88; 349/89; 349/183; 353/30; 353/34; 359/443; 359/449

(58) Field of Classification Search
USPC .................... 349/5, 7, 8, 88, 89, 183; 353/30, 353/34, 94, 122; 359/322, 443, 449
See application file for complete search history.

(56) References Cited

U.S. PATENT DOCUMENTS

| 6,421,147 | B2 | 7/2002 | Takada |
| 6,538,814 | B2 * | 3/2003 | Hunter et al. ................. 359/449 |
| 6,707,444 | B1 * | 3/2004 | Hendriks et al. ............. 345/156 |
| 7,557,341 | B2 * | 7/2009 | Chou et al. ................... 250/235 |
| 2011/0241986 | A1 * | 10/2011 | Feng et al. .................... 345/158 |

FOREIGN PATENT DOCUMENTS

| JP | 06-082748 | 3/1994 |
| JP | 2000-075139 | 3/2000 |

* cited by examiner

*Primary Examiner* — Hoan C Nguyen
(74) *Attorney, Agent, or Firm* — Maschoff Brennan

(57) ABSTRACT

A display system includes: a screen in which, in an area on which invisible light is incident, a scattering state where visible light is scattered and a transmission state where visible light is transmitted are switched; an image projection system to project an image of the visible light onto the screen; and an invisible light projection system to project the invisible light onto the screen and to cause an area of the screen onto which a desired portion of the image is projected to have the scattering state.

1 Claim, 14 Drawing Sheets

DISPLAY SYSTEM, SCREEN AND PROJECTOR WITH LIGHT ABSORPTION LAYER AND PHOTOCONDUCTIVE LAYER

The entire disclosure of Japanese Patent Application No. 2009-234286, filed Oct. 8, 2009 is expressly incorporated by reference herein.

BACKGROUND

1. Technical Field

The present invention relates to a display system, a screen and a projector.

2. Related Art

Hitherto, there is known a technique in which an image is displayed on a screen by a projector or the like. In recent years, a technique is proposed in which an image light is diffused and scattered by a transparent screen and an image is displayed. When this technique is used, a person or a physical body in an actual space where the screen is arranged is observed through the screen, and the image can be assimilated to the actual space.

For example, when information relating to a window-displayed exhibit is projected on the window glass, the information can be effectively displayed without disturbing the observation of the exhibit. At a bank window or the like, when information of a visitor is displayed to a receptionist side, or information of the receptionist is displayed to the visitor side, the counter work can be smoothly handled. In a television conference or unattended reception, when an image in which only a person is selected is projected, reality can be provided as if the person exists.

As stated above, when the transparent screen is used, an image can be displayed while the observer does not feel the existence of a device of a display, and the effective information provision and image presentation with high presence can be performed. As the transparent screen, those disclosed in JP-A-2000-75139 (patent document 1) and JP-A-6-82748 (patent document 2) are cited. The patent document 1 proposes a manufacturing method of a hologram screen on which a pattern obtained by interference between reference light of non-diffused light and object light diffused from a light diffusion body is recorded. The patent document 2 proposes a screen in which transmission and scattering can be switched by a liquid crystal layer.

The screen is required to be capable of displaying a high quality image, and further, the transparent screen is expected to have improve transparency from the viewpoint of erasing the display from consciousness. In the techniques of the patent documents 1 and 2, there is a problem to be improved in view of compatibility between the image quality and the transparency.

In the hologram screen of the patent document 1, the interference pattern between the reference light and the object light is recorded. Thus, when a viewing angle is made wide, since the transparency is degraded and the screen itself is observed, the presentation effect decreases. When the transparency is raised, since the viewing angle is narrowed and it becomes hard to observe the image, the image quality is deteriorated.

In the liquid crystal screen of the patent document 2, when a unit area where transmission and scattering are switched is driven by an active element such as a TFT, the active element becomes a reflection and scattering medium. Thus, the transparency is degraded. When the unit area is passive driven and the active element is not arranged on the screen, the number of scanning lines is at most four because of the VT threshold characteristic of the scattering liquid crystal. Then, the unit area to switch the transmission and scattering has a remarkably low resolution as compared with the image, and the periphery of the image becomes a large scattering area, and accordingly, the transparency is degraded.

SUMMARY

An advantage of some aspects of the invention is to provide a screen, a projector and a display system, in which the high scattering property of an image portion and the high transparency of a non-image portion are compatible, and an image with high presence can be displayed.

According to a first aspect of the invention, there is provided a display system including a screen in which, in an area on which invisible light is incident, a scattering state where visible light is scattered and a transmission state where the visible light is transmitted are switched, an image projection system to project an image of the visible light onto the screen, and an invisible light projection system to project the invisible light onto the screen and to cause an area of the screen onto which a desired portion of the image is projected to become the scattering state.

With this configuration, the screen of the area onto which the desired portion of the image is projected becomes the scattering state by the invisible light projection system, the image light incident on this area is scattered and observed, and the desired portion of the image is displayed. The area which becomes the scattering state can be controlled by controlling the area of the screen onto which the invisible light is projected. Accordingly, the necessity that a control element to control the scattering and transmission states of the screen for each area is provided in the screen becomes low, and the scattering, reflection and absorption of the visible light by the control element are remarkably reduced. Thus, the screen becomes hard to recognize, and the image with high presence can be displayed.

The display system according to the first aspect of the invention has following modes as typical modes.

It is preferable that the screen includes a pair of transparent electrode, a polymer-dispersed liquid crystal layer arranged between the pair of transparent electrodes, and a photoconductive layer which is arranged between at least one of the pair of transparent electrodes and the polymer-dispersed liquid crystal layer and impedance of which is changed by incidence of the invisible light.

With this configuration, the impedance of the photoconductive layer of the area on which the invisible light is incident is changed, and the intensity of the electric field applied to the polymer-dispersed liquid crystal layer is changed in this area. Accordingly, the scattering state and the transmission state of the polymer-dispersed liquid crystal layer corresponding to the incident area of the invisible light are changed, and the area onto which the image is projected by the image projection system can be brought into the scattering state.

It is preferable that the screen includes a wavelength selection film which is provided at a position where the invisible light emitted from the invisible light projection system through the photoconductive layer is incident, reflects the invisible light and allows the visible light to be transmitted through.

With this configuration, the invisible light passing through the photoconductive layer reflected by the wavelength selection film, and is again incident on the photoconductive layer. By this, the impedance of the photoconductive layer is changed also by the invisible light reflected by the wavelength selection film and secondarily incident on the photoconductive layer in addition to the invisible light primarily incident on the photoconductive layer. Accordingly, the change amount of the impedance per amount of the invisible light emitted from the invisible light projection system can be increased, and the output of the invisible light projection system can be reduced.

Besides, when invisible light resulting from external light is incident on the wavelength selection film from the opposite side to the photoconductive layer, this invisible light is reflected by the wavelength selection film and becomes hard to be incident on the photoconductive layer. Accordingly, in the area on which the invisible light resulting from the external light is incident, it is avoided that the screen does not become the desired transmission state or the scattering state, and the area which is brought into the transmission state or the scattering state can be controlled at high accuracy.

Especially, when the wavelength selection film is arranged between the polymer-dispersed liquid crystal layer and the photoconductive layer, the invisible light resulting from the invisible light projection system becomes hard to be incident on the polymer-dispersed liquid crystal layer. By this, it is avoided that the invisible light is incident on the photoconductive layer after being scattered by the polymer-dispersed liquid crystal layer, and the area which is brought into the transmission state or the scattering state can be controlled at high accuracy.

It is preferable that the screen includes a light absorption layer to absorb a complementary light which has a complementary color in subtractive color mixing with respect to a color light absorbed in the photoconductive layer.

With this configuration, it is possible to prevent coloring of the screen due to the absorption of the color light of a specific wavelength band in the photoconductive layer. Besides, since the screen can be made achromatic, visual stimulus can be reduced, and it becomes possible to erase the screen from observer's consciousness. Besides, it is possible to avoid that a restriction is applied to material selection of the photoconductive layer from the viewpoint of preventing coloring of the screen, and the degree of freedom of material selection of the photoconductive layer becomes high.

It is preferable that the polymer-dispersed liquid crystal layer has the transmission state in an electric field non-application state.

With this configuration, since it becomes hard to recognize the screen in the electric field non-application state, while power consumption of the screen is suppressed, it is possible to avoid that the screen interrupts the view.

It is preferable that a dichroism pigment is dispersed in the polymer-dispersed liquid crystal layer.

With this configuration, since external light incident on the screen is absorbed by the dichroism pigment, reduction in contrast ratio by the scattering of the external light is reduced.

It is preferable that the dichroism pigment absorbs a complementary light which has a complementary color in subtractive color mixing with respect to a color light absorbed in the photoconductive layer.

With this configuration, the reduction in the contrast ratio by the scattering of the external light is reduced, and it is possible to make the observer hard to recognize the screen.

It is preferable that an image correction section is provided which corrects image data supplied to the image projection system to cancel a hue change between the visible light before incidence on the screen and the visible light after emission from the screen.

With this configuration, the visible light corresponding to the corrected image data is emitted from the image projection system. In the visible light emitted from the image projection system, the change of the color balance due to passing through the screen is cancelled by the correction of the image data. Thus, the image faithful to the image data before the correction can be displayed.

It is preferable that a data supply section is provided which supplies range data indicating a range to be displayed in an input image to the invisible light projection system, and supplies image data contained in the range of the input image to the image projection system, the image projection system projects the image based on the image data, and the invisible light projection system projects the invisible light based on the range data.

With this configuration, the data supply section supplies the range data to the invisible light projection system, and supplies the image data conformable to the range data to the image projection system. Thus, the area which becomes the scattering state on the screen and the area onto which the desired portion of the image is projected can be easily made to correspond to each other at high accuracy.

It is preferable that a synthesizing element is provided which synthesizes the light projected by the image projection system and the light projected by the invisible light projection system.

With this configuration, since the visible light and the invisible light are synthesized by the synthesizing element and are projected onto the screen, the position and size of the image displayed by the visible light can be easily made to correspond to the position and size of the area which becomes the scattering state by the invisible light at high accuracy.

It is preferable that the image projection system includes a first light source system to emit the visible light and a first light modulation element to modulate the light emitted from the first light source system, the invisible light projection system includes a second light source system to emit the invisible light and a second light modulation element to modulate the light emitted from the second light source system, and the color synthesizing element synthesizes the light modulated by the first light modulation element and the light modulated by the second light modulation element, and a projection optical system to project the light synthesized by the synthesizing element is provided.

With this configuration, the visible light emitted from the first light source system is modulated by the first light modulation element, so that the image of the visible light can be formed. The invisible light emitted from the second light source system is modulated by the second light modulation element, so that the image of the invisible light of a pattern corresponding to the image can be formed. Since the image of the visible light and the image of the invisible light are synthesized and are projected, the projection optical system can be made common to the image projection system and the invisible light projection system, and the display system can be made low cost and small.

According to a second aspect of the invention, there is provided a screen, in which a scattering state where visible light is scattered and a transmission state where visible light is transmitted are switched in an area on which invisible light is incident.

With this configuration, since the scattering state and the transmission state of the screen are switched according to the area on which the invisible light is incident, the area which becomes the scattering state can be controlled from the outside of the screen. Accordingly, it is possible to reduce the necessity of providing the inside of the screen with a control element to control the screen so that each area has the scattering state, and the screen is hard to recognize. Thus, the image with high presence can be displayed.

According to a third aspect of the invention, there is provided a projector displaying an image on a screen in which a scattering state where visible light is scattered and a transmission state where visible light is transmitted are switched in an area on which invisible light is incident, and the projector includes an image projection system to project an image of visible light onto the screen, and an invisible light projection system that projects invisible light onto the screen and brings an area of the screen onto which a desired portion of the image is projected into the scattering state.

With this configuration, the area of the screen onto which the image is projected by the image projection system is brought into the scattering state by the invisible light projection system, the image light incident on the region is scattered and observed, and the image is displayed. Since the area which becomes the scattering state is controlled by the projector, it is possible to reduce the necessity of providing a control element to control the screen so that each area has the scattering state. Accordingly, the screen is hard to recognize, and the image with high presence can be displayed.

DESCRIPTION OF EXEMPLARY EMBODIMENTS

Figure 1A:
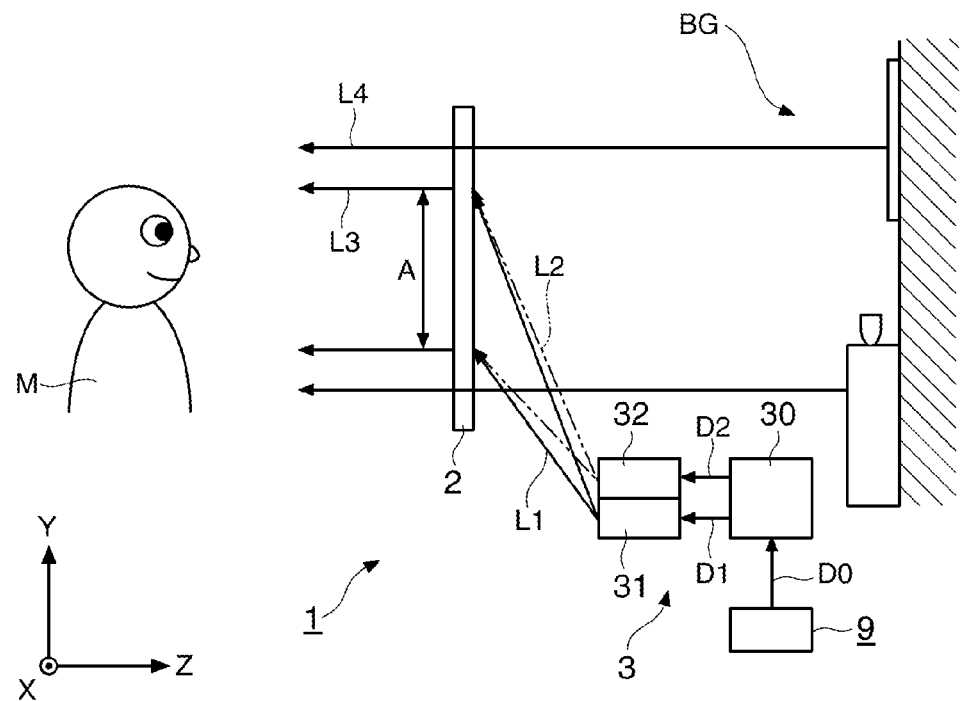
FIG. 1A is a structural view of a display system 1 and FIG. 1B is a view showing a use example.

Hereinafter, embodiments of the invention will be described with reference to the drawings. In the drawings used for the description, in order to show a feature portion plainly, there is a case where the size and scale of a structure in the drawings are different from those of an actual structure. Besides, there is a case where the same component in the embodiments is denoted by the same reference numeral and its detailed description is omitted. Incidentally, screens described in first to tenth embodiments are screens to which the invention is applied.

First Embodiment

Figure 1B:
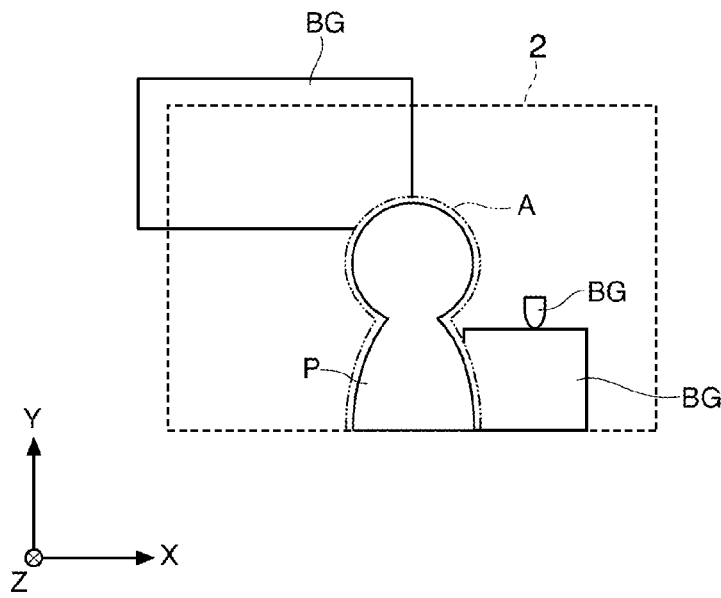

FIG. 1A is a schematic view showing a schematic structure of a display system 1 of a first embodiment, and FIG. 1B is a view showing a use example of the display system 1. As shown in FIGS. 1A and 1B, the display system 1 includes a screen 2 and a projector 3. The projector 3 includes a data supply section 30, an image projection system 31 and an invisible light projection system 32. The screen 2 is the screen to which the invention is applied, and the projector 3 is the projector to which the invention is applied.

In an XYZ orthogonal coordinate system shown in FIGS. 1A and 1B, directions along the principal plane of the screen 2 are an X direction and a Y direction, and a normal direction of the principal plane of the screen 2 is a Z direction. The X direction and the Z direction are, for example, the horizontal direction, and the Y direction is, for example, the vertical direction.

The display system 1 of the first embodiment roughly operates as described below. On the screen 2, a scattering state and a transmission state with respect to visible light are switched in an area on which an address light (invisible light) L2 is incident. The data supply section 30 receives input image data D0 to the projector 3 from a signal source 9 such as a personal computer. The data supply section 30 outputs image data D1 corresponding to an image P as a part of an input image to the image projection system 31. The data supply section 30 outputs range data D2 indicating a range in which the image P is displayed on the screen 2 to the invisible light projection system 32.

The invisible light projection system 32 projects an address light L2 of a pattern corresponding to a display area A onto the screen 2 so that the display area A for displaying the image P on the screen 2 is brought into a scattering state. The image projection system 31 forms the image P of visible light based on the image data D1, and projects an image light (visible light) L1 corresponding to the image P onto the screen 2.

On the screen 2, the display area A as the incident area of the image light L1 has the scattering state by the address light L2, and the screen 2 except the display area A is in the transmission state. The image light L1 is scattered in the display area A of the screen 2 and becomes a scattered light L3. The scattered light L3 is observed by an observer M, so that the image P is displayed. A visible light L4 from a background BG on the opposite side to the observer M with respect to the screen 2 is transmitted through a portion of the screen 2 except the display area A, and is observed by the observer M. The image P assimilated to the background BG of the actual space is displayed, and various space presentations can be performed. Hereinafter, the structure of the display system 1 will be described in detail.

Figure 2:
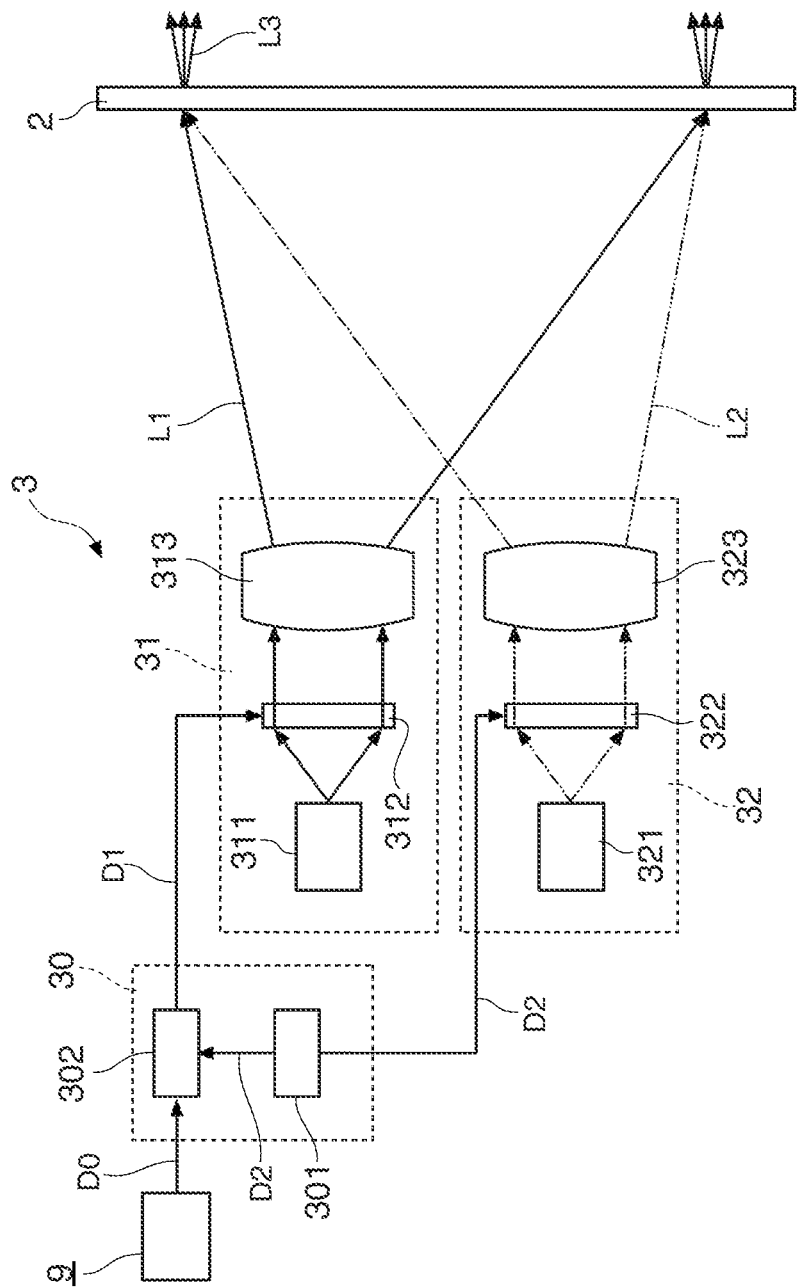
FIG. 2 is a schematic view showing a schematic structure of a projector 3.

FIG. 2 is a schematic view showing a structure of the projector 3. As shown in FIG. 2, the projector 3 includes the data supply section 30, the image projection system 31 and the invisible light projection system 32. In the projector 3 of this embodiment, a desired portion of an input image is made a partial image, and this partial image is displayed as the image P. The projector 3 is arranged, for example, on the opposite side to the display side (observer M) with respect to the screen 2 and outside the viewing field of the observer M through the screen 2.

The image projection system 31 includes a first light source device 311, a first light modulation element 312 and a first projection optical system 313. The first light source device 311 includes a lamp light source or a solid light source, and emits light including visible light. The first light modulation element 312 includes a transmission-type or reflection-type liquid crystal light bulb or a digital mirror device (DMD). The first light modulation element 312 modulates the light emitted from the first light source device 311 based on the image data D1, and emits the modulated light as image light L1. The first projection optical system 313 projects the image light L1 emitted from the first light modulation element 312 onto the screen 2.

The image projection system 31 actually forms the image light for each of plural color lights (for example, red, green, blue), synthesizes the image lights of the plural color lights by a color synthesizing element such as a dichroic prism, and then projects them by the first projection optical system 313. The first light modulation element is provided for each of the plural color lights.

As a specific structural example of the image projection system 31, there is a structure in which light emitted from a lamp light source as the first light source device is color-separated into plural color lights and is supplied to the first light modulation element. In this structure, the first light modulation element is provided for each of the color lights, and plural first light modulation elements are provided for one first light source device.

In addition to this structure, there is a structure in which plural solid light sources different in wavelength of emitted color light are adopted, and the first light modulation element is provided for each of the solid light sources. In this structure, the image projection system includes the plural first light source devices and the plural first light modulation elements.

The invisible light projection system 32 includes a second light source device 321, a second light modulation element 322, and a second projection optical system 323. The second light source device 321 includes a lamp light source or a solid light source, and emits light including invisible light (here, near-infrared light). The second light modulation element 322 includes various light modulation elements similarly to the first light modulation element 312. The second light modulation element 322 modulates the light emitted from the second light source device 321 based on the range data D2. The incident light is modulated into, for example, two gradations (two values of brightness and darkness) for each pixel of the second light modulation element 322, and becomes the address light L2 corresponding to the image P. In other words, the address light L2 is the image of the invisible light, and the contour of this image is substantially coincident with the contour of the image P.

The second projection optical system 323 projects the address light L2 emitted from the second light modulation element 322 so that the address light L2 overlaps with the image light L1 on the screen 2. In the second projection optical system 323 of this embodiment, the focus and zoom are controlled in synchronization with the first projection optical system 313. By this, an area (hereinafter referred to as an IR incident area) of the screen 2 onto which the address light L2 is projected can be made to correspond to the display area A at high accuracy.

The data supply section 30 includes a display range setting section 301 and an image extraction section 302. The display range setting section 301 outputs the range data D2 indicating the range (range of the partial image) to be displayed in the input image to the image extraction section 302 and the second light modulation element 322. The range of the partial image is set by, for example, the input of the user. The image extraction section 302 generates the image data D1 by holding gradation values of pixels constituting the image P in the input image data D0 and rewriting gradation values of pixels other than the image P to be blank (for example, black). The image extraction section 302 outputs the image data D1 to the first light modulation element 312.

Figure 3A:
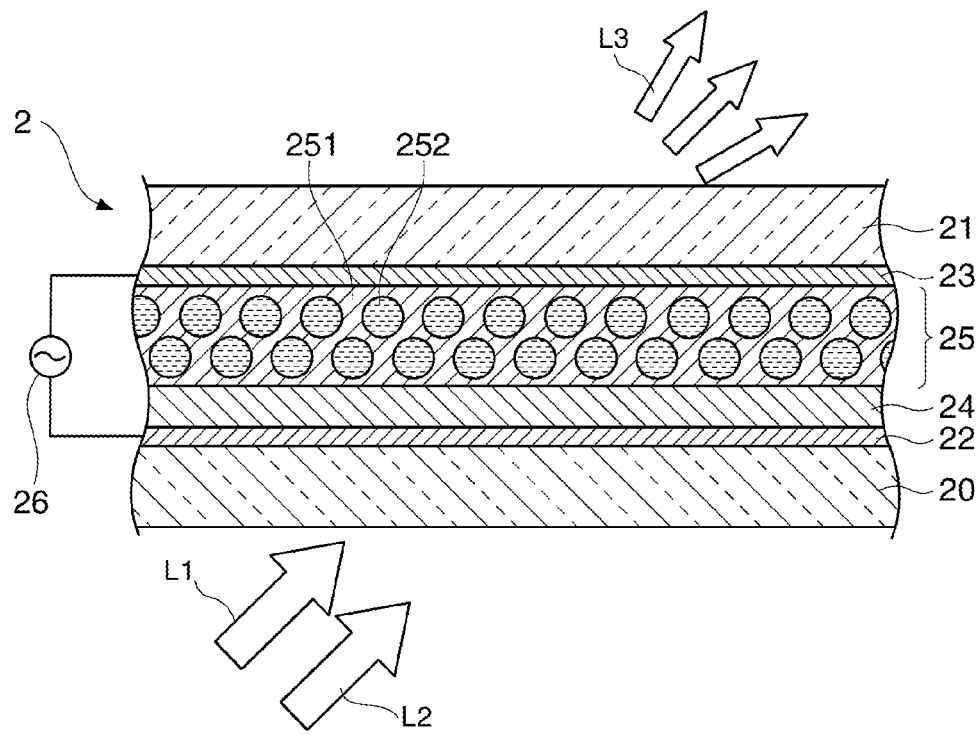
FIG. 3A is a sectional view of a screen 2A and FIG. 3B is an equivalent circuit view.
Figure 3B:
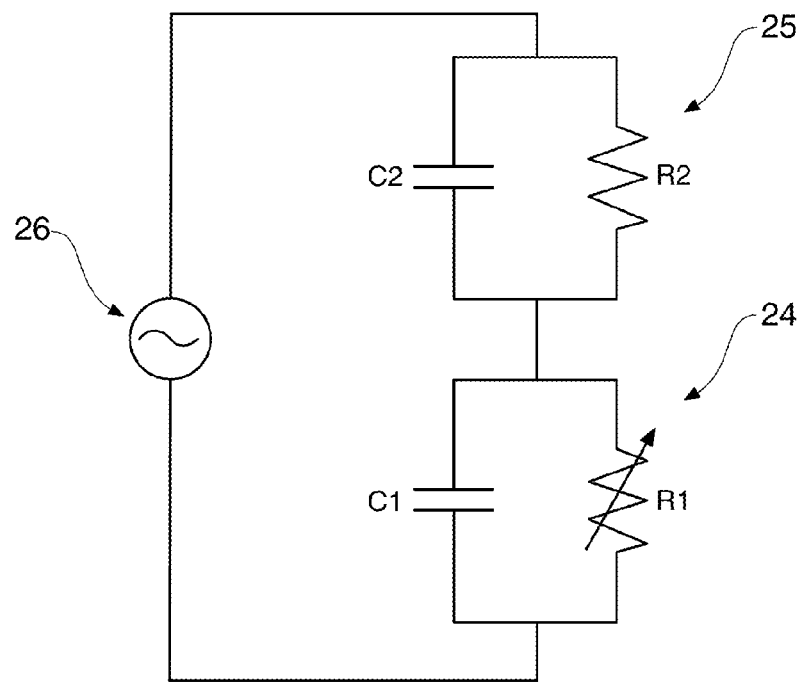
Figure 4:
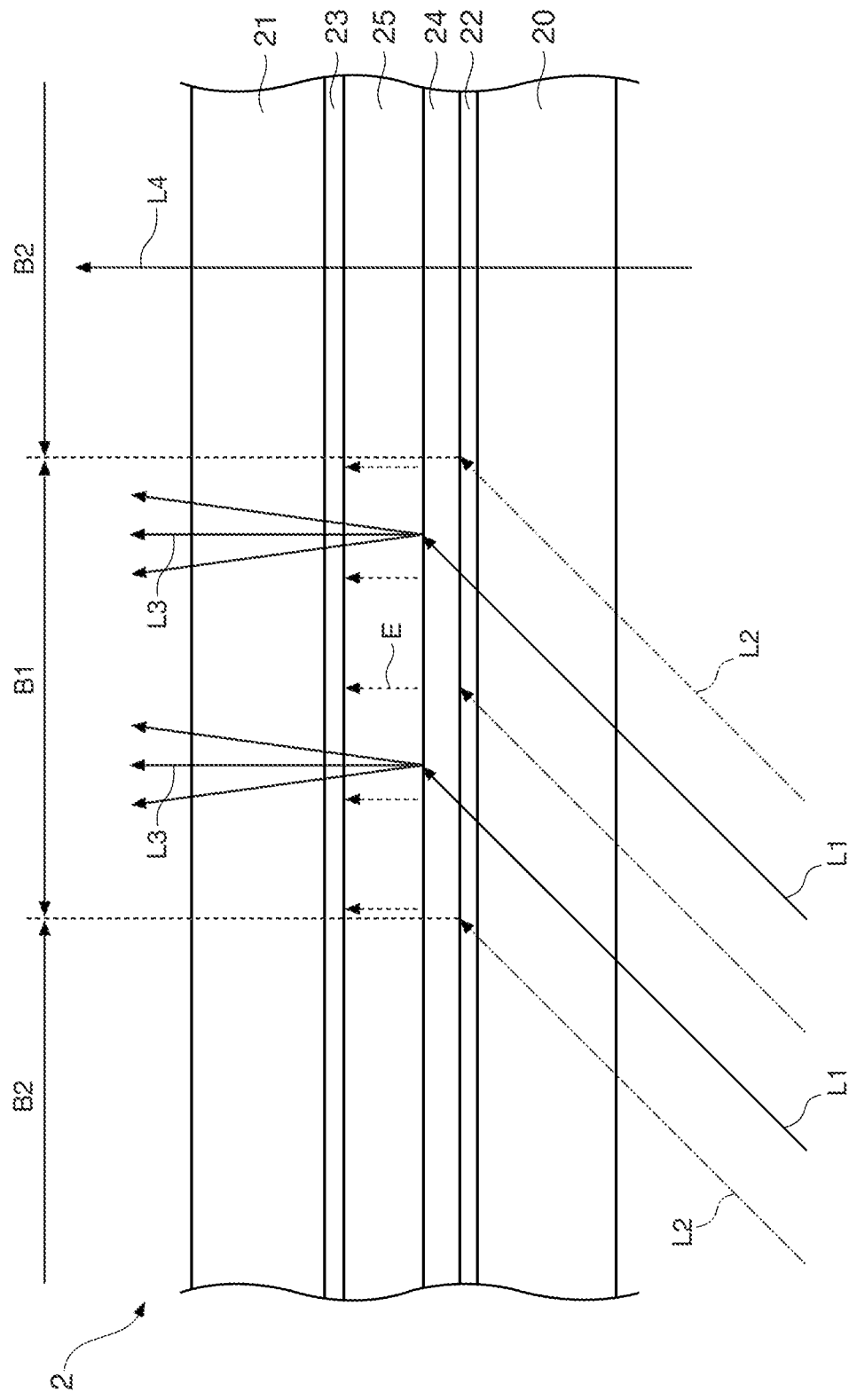
FIG. 4 is an explanatory view showing an operation principle of a screen.

FIG. 3A is an enlarged sectional view showing a structure of the screen 2, FIG. 3B is an equivalent circuit view of the screen 2, and FIG. 4 is an explanatory view showing the operation principle of the screen 2. As shown in FIG. 3A, the screen 2 includes a pair of transparent substrates 20 and 21, a pair of transparent electrodes 22 and 23, a photoconductive layer 24 and a PDLC (polymer-dispersed liquid crystal layer) 25. The PDLC 25 includes a polymer part 251 and a liquid crystal part 252.

The PDLC 25 is arranged between the transparent substrates 20 and 21. Here, the image light L1 and the address light L2 are incident from the transparent substrate 20 side, and are emitted from the transparent substrate 21 side. The transparent electrode 22 is arranged between the PDLC 25 and the transparent substrate 20. The transparent electrode 23 is arranged between the polymer-dispersed liquid crystal layer and the transparent substrate 21. The transparent electrodes 22 and 23 are continuously formed in a range wider than the pixel size of the image displayed on the screen 2. Here, the transparent electrode 22 is formed all over one side of the transparent substrate 20, and the transparent electrode 23 is formed all over one side of the transparent substrate 21. The screen 2 is used in a state where the transparent electrodes 22 and 23 are electrically connected to an external power source 26. The photoconductive layer 24 is arranged between the transparent electrode 22 and the PDLC 25, that is, on the incident side of the address light L2 with respect to the PDLC 25.

The transparent substrates 20 and 21 are made of, for example, glass substrates having transparency. The transparent electrodes 22 and 23 are made of conductive material having transparency, for example, indium tin oxide (ITO). The photoconductive layer 24 is made of a material in which the impedance of a portion on which infrared light or ultraviolet light is incident is changed. As the formation material of the photoconductive layer 24, for example, inorganic material such as amorphous silicon and organic material such as metal phthalocyanine compound are enumerated.

When the photoconductive layer 24 made of the organic material is adopted, as compared with the inorganic material, the degree of freedom of material selection becomes high, and it becomes easy to design the absorption wavelength band of the photoconductive layer 24. The photoconductive layer 24 may be a resistance reducing type in which the impedance is reduced by the incidence of invisible light, or a resistance increasing type in which the impedance is increased by the incidence of invisible light. The photoconductive layer 24 of this embodiment is made of titanyloxy phthalocyanine compound, has a peak of the absorption wavelength band in a near-infrared region, and is the resistance reducing type in which the impedance is reduced by the absorption of infrared light.

The PDLC 25 can switch the transmission state and the scattering state by the intensity of applied electric field. The scattering state is a mode in which the degree of scattering of light incident on the PDLC 25 becomes relatively larger than that of the transmission state. The degree of scattering can be evaluated by comparing, for example, the diffusion angle or the half width at half maximum of intensity distribution between the incident light and the emitted light. In general, as an increase in the diffusion angle of the emitted light with respect to the incident light or an increase in the half width at half maximum becomes large, the degree of diffusion becomes remarkable.

The PDLC 25 may be a normal type or a reverse type. The normal type becomes the scattering state in an electric field non-application state, and becomes the transmission state in an electric field application state. The reverse type becomes the scattering state in an electric field non-application state and becomes the transmission state in an electric field application state. Although the details will be described later, the relation between the IR incident area of the address light L2 and the display area A of the image P is determined by the combination of the type of the photoconductive layer 24 and the type of the PDLC 25.

The PDLC 25 of this embodiment is the reverse type. When an electric field is applied to the PDLC 25, although the orientation angle of the polymer part 251 is not changed, the orientation angle of the liquid crystal molecule included in the liquid crystal part 252 is changed. Then, the refractive index is discontinuously changed between the polymer part 251 and the liquid crystal part 252, and the light incident on the PDLC 25 is scattered.

The photoconductive layer 24 can be regarded as a circuit element in which a capacitance component C1 and a variable resistance component R1 whose impedance is changed by light input are connected in parallel to each other. The PDLC 25 can be regarded as a circuit element in which a capacitance component C2 and a resistance component R2 are connected in parallel, and are connected in series to the photoconductive layer 24. In the state where voltage is applied to the transparent electrodes 22 and 23, as the variable resistance component R1 becomes small to the resistance component R2, voltage applied to the capacitance component C2, that is, intensity of electric field applied to the PDLC 25 becomes large. The variable resistance component R1 to the resistance component R2 is set to be a specified value or more, so that the PDLC 25 does not become the scattering state in the state where voltage is applied to the transparent electrodes 22 and 23 and the address light L2 is not incident.

In the screen 2 of the structure as described above, at the time of power off when voltage is not applied between the pair of transparent electrodes 22 and 23, the PDLC 25 is in the transmission state. As shown in FIG. 4, at the time of power on when voltage is applied between the pair of transparent electrodes 22 and 23, when the address light L2 is incident on the photoconductive layer 24, the impedance of the photoconductive layer 24 in the IR incident area B1 is reduced. Then, the IR incident area B1 selectively functions as an electrode to the PDLC 25 in the photoconductive layer 24, and electric field E to change the orientation angle of the liquid crystal molecule of the liquid crystal part 252 is applied to the PDLC 25 corresponding to the IR incident area B1. By this, the PDLC 25 of the IR incident area B1 becomes the scattering state, and the image light L1 incident on the IR incident area B1 of the address light L2 is forward scattered by the PDLC 25 and becomes the scattered light L3.

In an IR non-incident area B2 on which the address light L2 is not incident, since the PDLC 25 is held in the transmission state, the screen 2 is transparent. The light incident on the IR non-incident area B2 is hardly scattered by the screen 2 and passes through the screen 2. The light incident on the IR non-incident area B2 is the visible light L4 from the background BG, and the light emitted from the image projection system 31 and not contributing to the display, for example, the image light corresponding to an image (hereinafter referred to as a peripheral image) obtained by removing the partial image from the incident image. When the projector 3 is arranged outside the viewing field range through the screen 2, the image light not contributing to the display advances in a direction different from the observer M after passing through the screen 2. That is, the light not contributing to the display is hardly incident on the eyeball of the observer M and the peripheral image is hardly recognized.

As described above, in the screen 2, the position and the size of the display area A can be controlled by controlling the position and the size of the IR incident area B1. That is, even if a switching element to control switching of the transmission and scattering states for each divided area such as a pixel is not provided in the inside of the screen 2, it is possible to control the position and the size of the display area A from the outside of the screen 2.

Next, the relation between the display area A of the image P and the IR incident area of the address light L2 will be described. Table 1 below shows the relation between the IR incident area of the address light L2 and the display area A of the image P for each combination of the type of the photoconductive layer 24 and the type of the PDLC 25. In Table 1, power off indicates the state where voltage is not applied between the transparent electrodes 22 and 23, and power on indicates the state where voltage is applied between the transparent electrodes 22 and 23. Besides, the IR non-incidence indicates the state where the address light L2 is not incident, and the IR incidence indicates the state where the address light L2 is incident.

TABLE 1

|  | Combination 1 | Combination 2 | Combination 3 | Combination 4 |
| --- | --- | --- | --- | --- |
| type of photoconductive layer | resistance reducing type | resistance reducing type | resistance increasing type | resistance increasing type |
| type of PDLC | reverse type | normal type | reverse type | normal type |
| power off | transmission | scattering | transmission | scattering |
| power on and IR non-incidence | transmission | scattering | scattering | transmission |
| power on and IR incidence | scattering | transmission | transmission | scattering |
| IR incident area | display area | non-display area | non-display area | display area |

The combination 1 is the foregoing structure, the photoconductive layer 24 is the resistance reducing type, and the PDLC 25 is the reverse type. In the combination 1, when the address light L2 is projected onto the display area A, the display area A is switched to the scattering state, the image P is displayed in the display area A, and the non-display area is kept transparent.

In the combination 2, the photoconductive layer is the resistance reducing type, and the PDLC is the normal type. The PDLC of the combination 2 has the scattering state at the time of power off, and has the scattering state at the time of power on and non-incidence of the address light. In the combination 2, when the address light L2 is projected onto the non-display area, the non-display area becomes transparent, the display area A is kept in the scattering state, and the image P is displayed in the display area A.

In the combination 3, the photoconductive layer is the resistance increasing type, and the PDLC is the reverse type. The PDLC of the combination 3 has the transmission state at the time of power off, and has the scattering state at the time of power on and non-incidence of the address light. In the combination 3, when the address light L2 is projected onto the non-display area, the non-display area becomes transparent, the display area A is kept in the scattering state, and the image P is displayed in the display area A.

In the combination 4, the photoconductive layer is the resistance increasing type, and the PDLC is the normal type. The PDLC of the combination 2 has the scattering state at the time of power off, and has the transmission state at the time of power on and non-incidence of the address light. In the combination 4, when the address light L2 is projected onto the display area A, the display area A is switched to the scattering state, the image P is displayed in the display area A, and the non-display area is kept transparent.

As described above, even when any of the combinations 1 to 4 is adopted, while the image P is displayed in the display area A, the screen 2 except the display area A can be made transparent by setting the IR incident area of the address light L2 according to the combination of the type of the PDLC and the type of the polymer-dispersed liquid crystal layer.

When the reverse type PDLC is adopted, since the screen 2 becomes transparent at the time of power off, while power consumption is suppressed, it is possible to avoid that the screen 2 interrupts the view.

When the normal type PDLC is adopted, the screen 2 becomes the scattering state at the time of power off, and while power consumption is suppressed, the screen can be used as a normal screen.

When the combination 1 or the combination 4 is selected, since the screen becomes transparent even in the state where an image is not displayed at the time of power on, the screen hardly interrupts the view. Incidentally, when the combination 2 or the combination 4 is adopted, in order to make the screen transparent in the state where an image is not displayed at the time of power on, the address light has only to be projected onto the whole screen.

In the display system 1 of the first embodiment, the position and the size of the area which becomes the scattering state in the screen 2 can be controlled by projecting the address light L2 from the outside of the screen 2. Accordingly, it becomes unnecessary to provide a switching element in the inside of the screen 2 in order to control the area which becomes the scattering state. Since the reflection, absorption and scattering of light by the switching element can be eliminated, the transparency of the screen 2 can be improved. Thus, the image P can be displayed while the screen 2 itself is not noticed, and various space presentations can be performed. For example, as if content exits in the same space as the screen 2, the content can be displayed by the image with high presence.

In the screen 2, since the photoconductive layer 24 is arranged at the incident side of the address light L2 with respect to the PDLC 25, the address light L2 incident on the photoconductive layer 24 becomes hard to receive the scattering effect of the PDLC 25. Accordingly, in the photoconductive layer 24, the area on which the address light L2 is incident can be controlled at high accuracy, and the area which becomes the scattering state can be made to correspond to the display area A at high accuracy.

Since the image projection system 31 is arranged on the opposite side to the observer M with respect to the screen 2, as compared with the case where an image is displayed by the reflected scattered light, it is easy to display an image of high contrast. Besides, since the image light corresponding to the input image except the partial image to be displayed is hard to be recognized by the observer, it is easy to selectively display only the desired area in the input image.

When a telepresence system is configured by the display system 1 as described above, since a high presence can be obtained, smooth communication can be realized in a television conference or unmanned reception. Besides, the display system 1 can be applied also to digital signage or window display. For example, when an exhibit is arranged at the back of the screen 2 when seen from the observer, and exhibit information is displayed on the screen 2, the exhibit information can be effectively displayed.

Second Embodiment

Next, a display system of a second embodiment will be described with reference to FIGS. 5A and 5B.

Figure 5A:
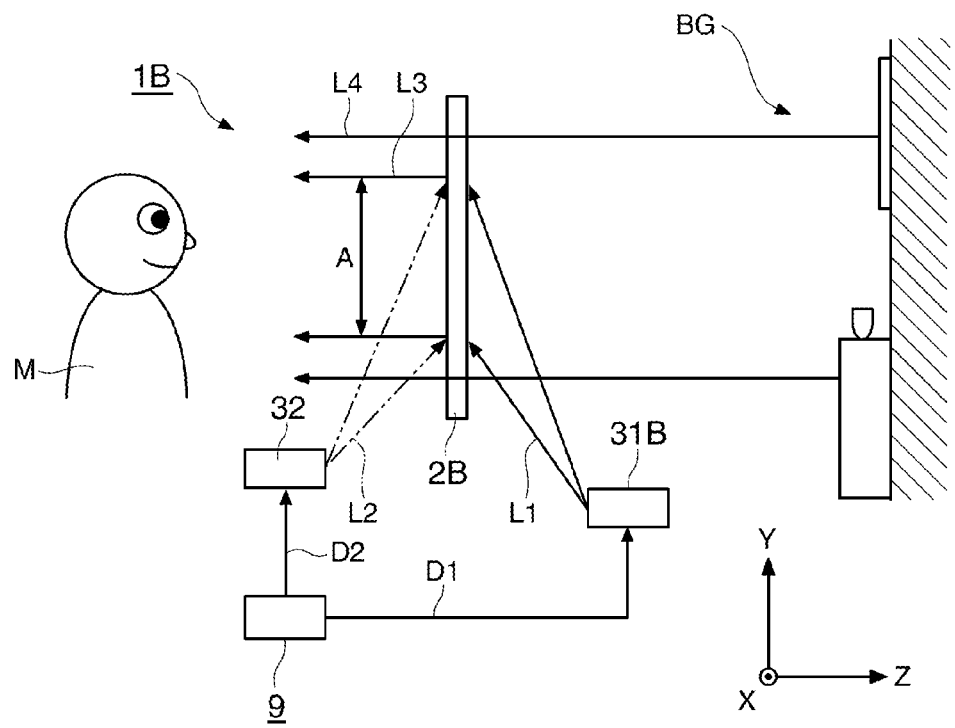
FIG. 5A is a structural view of a display system 1B and FIG. 5B is a sectional view of a screen 2B.
Figure 5B:
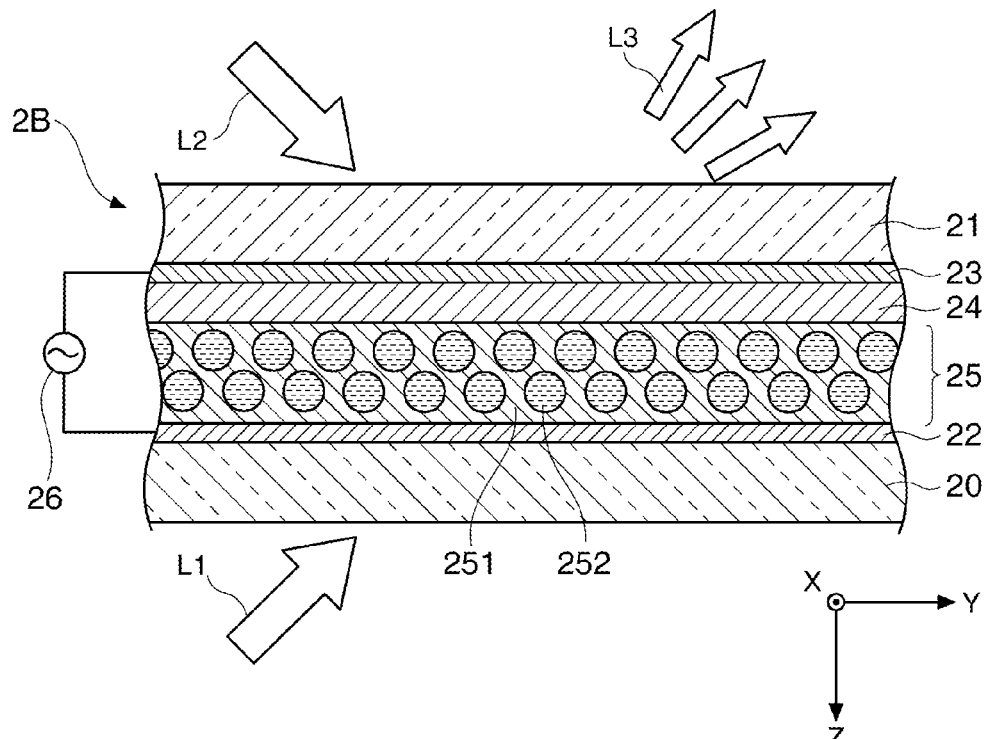

FIG. 5A is a schematic view showing a schematic structure of a display system 1B of the second embodiment, and FIG. 5B is an enlarged sectional view showing a structure of the screen 2B. The display system 1B is different from the first embodiment in that an image projection system 31B is constructed as an apparatus independent of an invisible light projection system 32.

The image projection system 31B projects an image light L1 onto a screen 2B based on image data D2 supplied from a signal source 9. The image projection system 31B is constructed of, for example, a projection-type or scanning-type projector. The image projection system 31B can be constructed of a normal projector.

The invisible light projection system 32 projects an address light L2 onto the screen 2B based on range data D1 supplied from the signal source 9. The invisible light projection system 32 is arranged on the opposite side to the image projection system 31B with respect to the screen 2B. The invisible light projection system 32 is constructed of, for example, a projection-type or scanning-type projector.

As shown in FIG. 5B, in the screen 2B, a photoconductive layer 24 is arranged on the incident side of the address light L2 with respect to a PDLC 25. The relative position of the invisible light projection system 32 of this embodiment with respect to the screen 2B is fixed, and the invisible light projection system 32 and the screen 2B constitute a screen system. By this, it is easy to control the position and size of an IR incident area of the address light L2 on the screen 2B at high accuracy.

Here, the arrangement side of the invisible light projection system 32 with respect to the screen 2B is the display side. Similarly to the first embodiment, the invisible light projection system 31 may be arranged on the image projection system 31B side with respect to the screen 2B. Besides, the arrangement side of the image projection system 31B with respect to the screen 2B may be the display side.

In order to display an image by the display system 1B of the structure as described above, for example, in a state in which a position where the image light L1 is incident on the screen 2B is adjusted, the image light L1 is projected from the image projection system 31B. Then, similarly to the first embodiment, an image is displayed in a display area A, and a non-display area becomes transparent. In the second embodiment, for example, even when an image light is projected similarly in a normal method by a projector having a normal structure, the image with high presence is displayed.

Third Embodiment

Next, a display system of a third embodiment will be described. The third embodiment is different from the first and the second embodiments in that a screen includes a light absorption layer to absorb a complementary light which has a complementary color in subtractive color mixing with respect to a color light absorbed in a photoconductive layer.

Figure 6A:
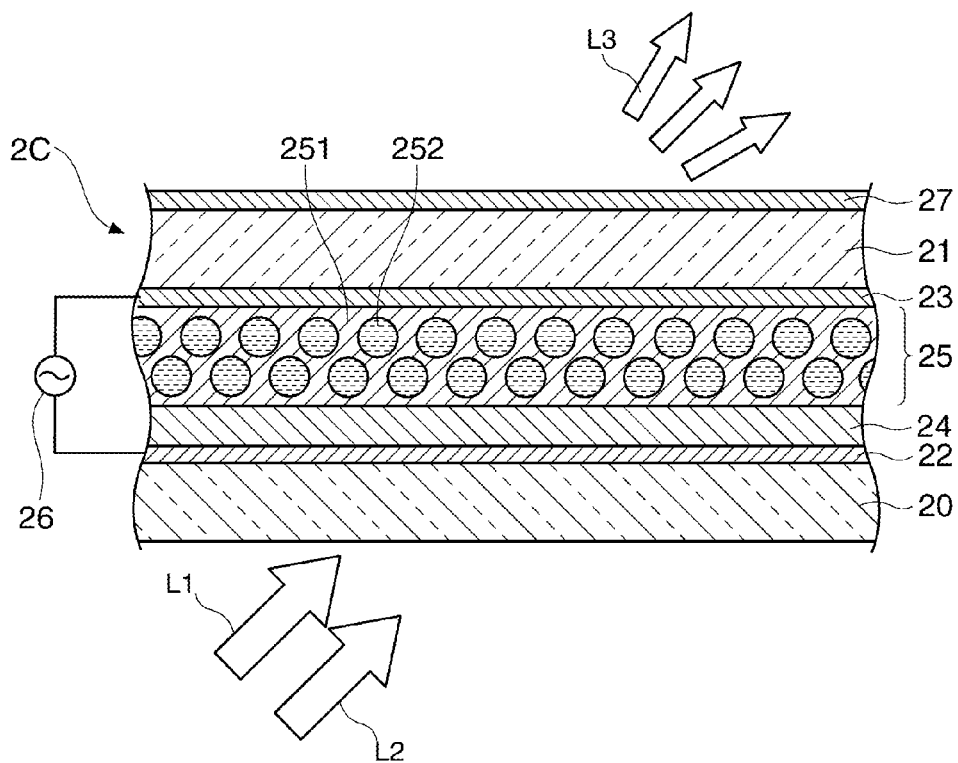
FIG. 6A is a sectional view of a screen 2C and FIG. 6B is a graph of an optical absorption spectrum.
Figure 6B:
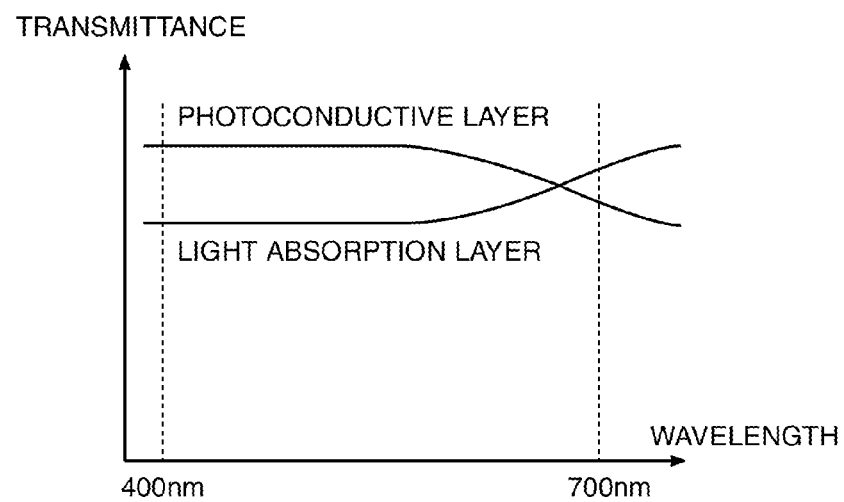

FIG. 6A is an enlarged sectional view showing a structure of a screen 2C in the display system of the third embodiment, and FIG. 6B is a graph showing light absorption spectra of a photoconductive layer and a light absorption layer. The horizontal axis of the graph shown in FIG. 6B indicates the wavelength, and the vertical axis indicates the transmittance.

As shown in FIG. 6A, the screen 2C includes a light absorption layer 27. The light absorption layer 27 is formed on the surface of a transparent substrate 21 on the opposite side to a transparent electrode 23. The light absorption layer 27 is constructed of, for example, a color filter.

As described in the first embodiment, a photoconductive layer 24 has a peak of absorption wavelength band in a near-infrared region. The absorption wavelength band of the photoconductive layer 24 extends to a part of the visible light wavelength band (in view of relative luminosity, roughly 400 nm or more and 700 nm or less). In the photoconductive layer 24, the transmittance to the wavelength of incident light on the long wavelength side of the wavelength band of the visible light is relatively lower than that on the short wavelength side. The transmittance of the light absorption layer 27 on the long wavelength side of the wavelength band of the visible light is relatively higher than that on the short wavelength side. Here, the material of the light absorption layer 27 is selected so that the product of the transmittance of the photoconductive layer 24 and the transmittance of the light absorption layer 27 at an arbitrary wavelength of the wavelength band of the visible light becomes substantially uniform in the wavelength band of the visible light.

In the display system of the structure as described above, apart of the light incident on the screen 2C is absorbed in the photoconductive layer 24. The light amount of color light absorbed in the photoconductive layer 24 on the long wavelength side (for example, red light) is larger than that on the short wavelength side (for example, blue light). The light passing through the photoconductive layer 24 is incident on the light absorption layer 27, and a part thereof is absorbed. The light amount of color light absorbed in the light absorption layer 27 on the short wavelength side (for example, blue light) is larger than that on the long wavelength side (for example, red light). Accordingly, the change in color balance due to the absorption of the color light in the photoconductive layer 24 is cancelled by the change in color balance due to the absorption of the color light in the light absorption layer 27. Thus, the change in color balance, in the screen 2C, of the light passing through the screen 2C is remarkably reduced.

For example, in the light incident on the screen 2C, the red light is selectively absorbed in the photoconductive layer 24 and a tincture of blue is intensified, and then, the blue light which has a complementary color in subtractive color mixing with respect to the red light is absorbed in the light absorption layer 27 and the tincture of blue is reduced. As stated above, the light passing through the screen 2C has the same color balance as that before the light is incident on the screen 2C, and coloring of the light passing through the screen 2C is prevented. Since the coloring of external light incident on the non-display area is prevented, the achromatic property of the screen 2C can be raised. Since the coloring of the image light L1 incident on the display area is prevented, reduction of image quality is prevented.

Incidentally, the light absorption layer 27 may be arranged between the transparent substrates 20 and 21, or may be arranged on the opposite side to the transparent electrode with respect to the transparent substrate 20. The characteristic of the light absorption layer 27 may be set based on the entire light absorption spectrum of plural layers including the photoconductive layer 24. For example, the light absorption spectrum of the light absorption layer 27 may be set so as to absorb a complementary light which has a complementary color in subtractive color mixing with respect to a color light absorbed in the screen 2C except the light absorption layer 27. By this, the achromatic property of the whole screen 2C can be raised.

Fourth Embodiment

Figure 7:
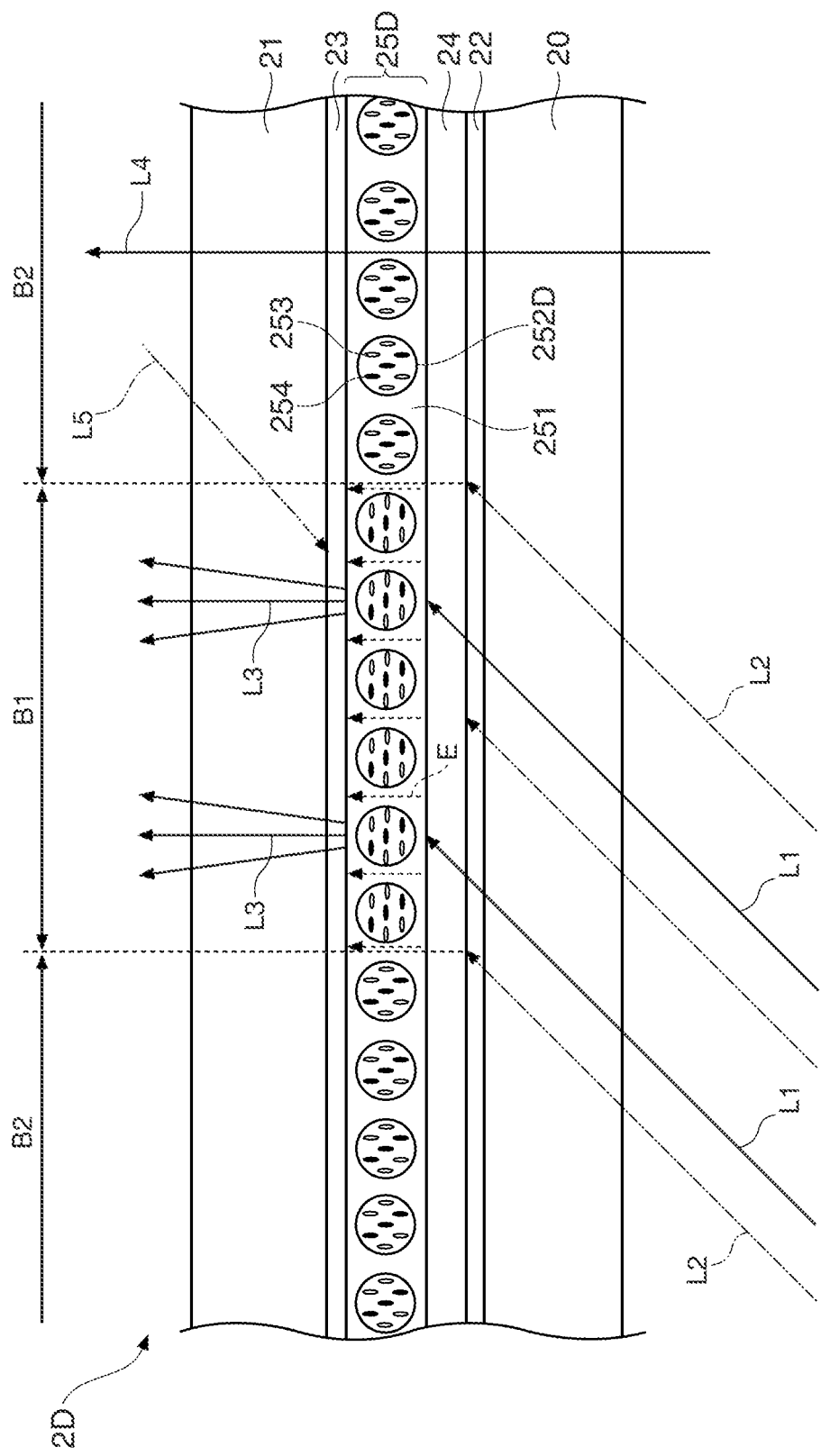
FIG. 7 is an enlarged sectional view showing a structure of a screen 2D of a fourth embodiment.

Next, a display system of a fourth embodiment will be described with reference to FIG. 7. FIG. 7 is an enlarged sectional view showing a structure of a screen 2D in the display system of the fourth embodiment. As shown in FIG. 7, in the screen 2D, a liquid crystal molecule 253 and a dichroism pigment 254 are dispersed in a liquid crystal part 252D of a PDLC 25D.

The dichroism pigment 254 is oriented so that in an IR non-incident area B2 where an address light L2 is not incident on a photoconductive layer 24, a long axis direction is a thickness direction of the screen 2D. In an IR incident area B1 (display area A) where the address light L2 is incident, an electric field E to change the orientation angle of the liquid crystal molecule 25 is applied to the PDLC 25D. Then, the orientation angle of the dichroism pigment 254 is changed so that the short axis direction of the dichroism pigment 254 becomes the thickness direction of the screen 2D. By this, the projection area of the dichroism pigment 254 to the surface of the screen 2D is increased, and the amount of light absorbed by the dichroism pigment 254 in the light incident on the surface of the screen 2D is increased. The light incident on the screen 2D is an image light L1 from an image projection system and an external light L5 from an interior lamp or the like, and part of the image light L1 and the external light L5 are absorbed by the dichroism pigment 254. Since the intensity of the image light L1 emitted from the image projection system is remarkably higher than the intensity of the external light L5, when the external light L5 is absorbed by the dichroism pigment 254, the reduction in contrast ratio by the external light scattering is remarkably suppressed.

In the display system of the fourth embodiment as described above, since the reduction in contrast ratio by the external light scattering is remarkably suppressed, a high quality image can be displayed. As the dichroism pigment 254, although a black one may be used, a pigment to absorb a complementary light which has a complementary color in subtractive color mixing with respect to a color light absorbed in the photoconductive layer 24 may be adopted. By this, by the same reason as that described in the third embodiment, the coloring of the screen due to the selective absorption of color light of a specific wavelength band in the photoconductive layer 24 can be avoided.

Fifth Embodiment

Figure 8:
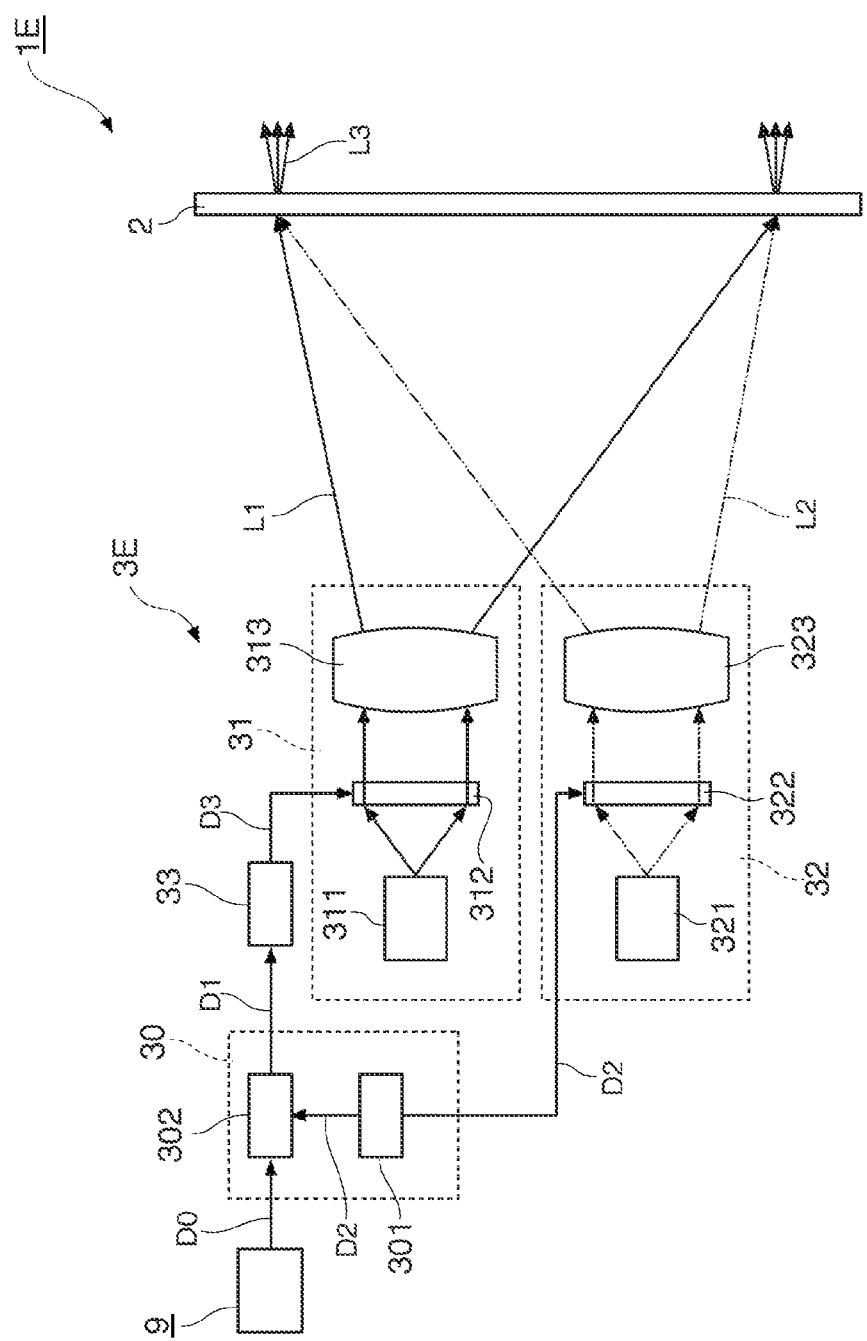
FIG. 8 is a schematic view showing a schematic structure of a display system 1E of a fifth embodiment.
Figure 9A:
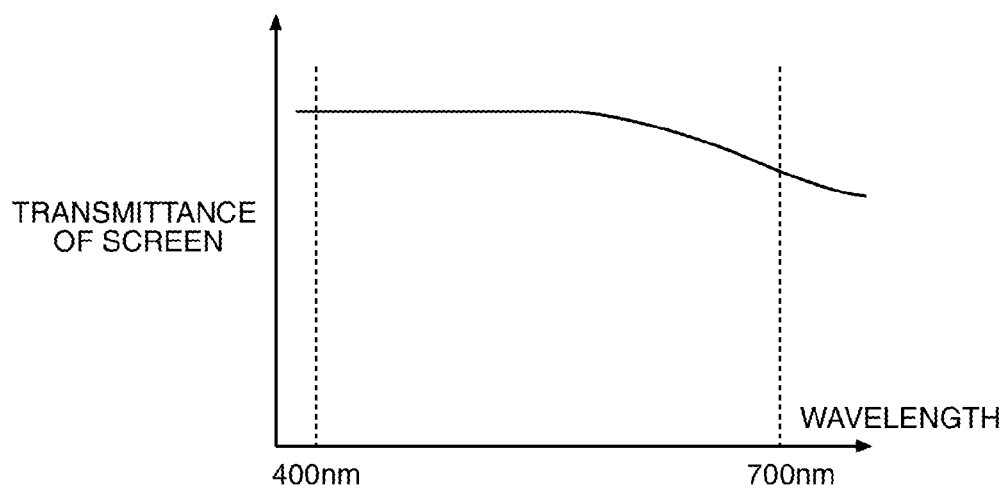
FIGS. 9A to 9C are explanatory views showing characteristics of an image processing section.
Figure 9B:
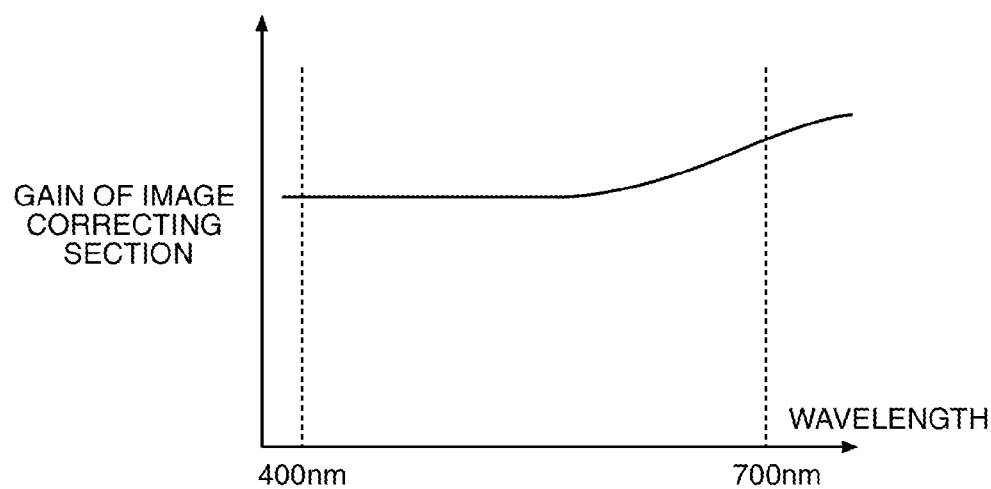
Figure 9C:
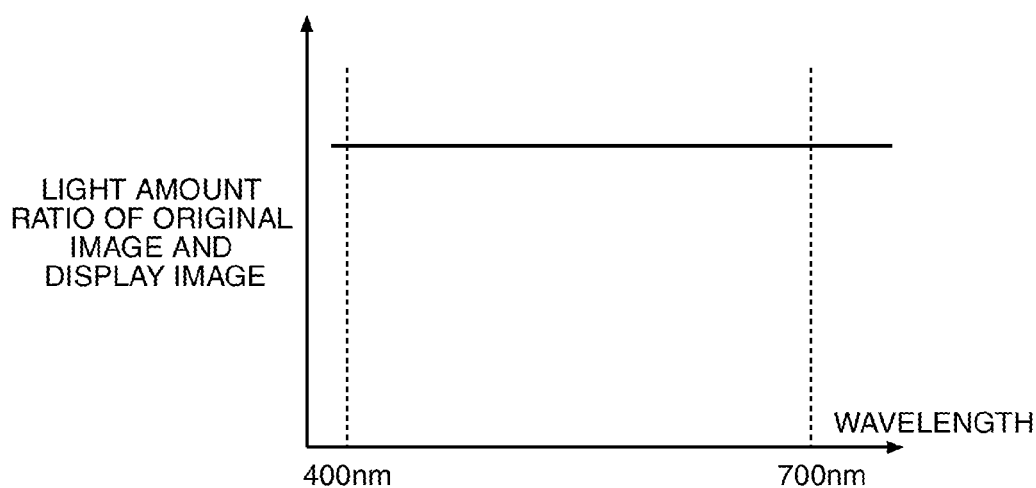

Next, a display system 1E of a fifth embodiment will be described with reference to FIG. 8 and FIGS. 9A to 9C. FIG. 8 is a schematic view showing a schematic structure of the display system 1E of the fifth embodiment, and FIGS. 9A to 9C are explanatory views showing characteristics of an image processing section. The display system 1E includes a screen 2 and a projector 3E to which the invention is applied. As the screen 2, any of the screens to which the invention is applied may be adopted.

The projector 3E is different from the projector 3 described in the first embodiment in that an image correction section 33 is included. The image correction section 33 of this embodiment receives image data D1 from a data supply section 30 and corrects it, and then outputs corrected image data D3 to a first light modulation element 312. The image correction section 33 corrects the image data D1 to cancel the hue change on the screen 2 based on the light absorption spectrum of the screen 2. The first light modulation element 312 modulates visible light emitted from a first light source device 311 based on the corrected image data D3 and forms an image light L1. The image light L1 is projected onto the screen 2 by a projection optical system 313.

FIG. 9A is a graph showing the transmittance of the screen 2 with respect to the wavelength of incident light, FIG. 9B is a graph showing the wavelength characteristic of gain in the image correction section, and FIG. 9C is a graph showing the light amount ratio of an original image to a display image.

As described in the third embodiment, the absorption wavelength band of the photoconductive layer 24 extends to a part of the wavelength band of visible light. As shown in FIG. 9A, the transmittance of the screen 2 is relatively lower on the long wavelength side of the wavelength band of the visible light than on the short wavelength side mainly due to the absorption wavelength band of the photoconductive layer 24.

In the image correction section 33, the wavelength characteristic of gain is set based on the light absorption spectrum of the screen 2. As shown in FIG. 9B, in the image correction section 33, the gain becomes relatively high at the wavelength where the transmittance of the screen 2 becomes relatively low, and the gain is substantially constant in the wavelength band where the transmittance of the screen 2 becomes substantially constant. That is, the image correction section 33 corrects the image data D1 so that, with respect to the color light which is included in the image light L1 before incidence on the screen 2 and is relatively easily absorbed by the screen 2, the light amount of the color light emitted from the first modulation element 311 becomes larger than the light amount specified by the image data D1.

In the image light L1 incident on the screen 2, the light amount of the color light which is relatively easily absorbed by the screen 2 is increased as compared with the original image before the correction, and this increment is absorbed by the screen 2. In this way, the hue change in the screen 2 is cancelled, and as shown in FIG. 9C, the ratio of the light amount of the original image to the light amount of the display image becomes substantially uniform in the wavelength band of the visible light.

In the display system 1E of the structure of the fifth embodiment as described above, an image in which the color balance of the original image is faithfully reproduced can be displayed, and the reduction in quality of the image due to the light absorption of the screen 2 is prevented. Incidentally, the connection relation of the image correction section 33 can be suitably changed as long as the image data supplied to the element to modulate the visible light into the image light is corrected. For example, the image correction section receives input image data from a signal source 9, and may output corrected image data to an image extraction section. When the image extraction section is not provided, the image correction section receives input image data from the signal source 9 and may output the corrected image data to the first light modulation element.

Sixth Embodiment

Figure 10:
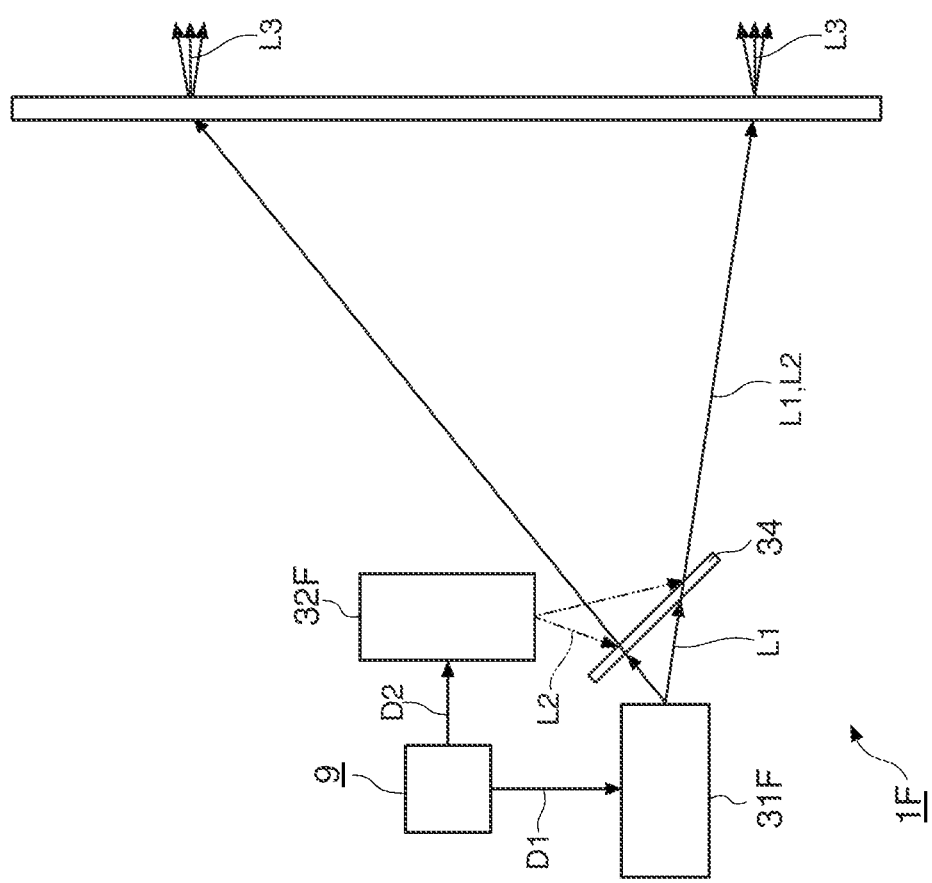
FIG. 10 is a schematic view showing a schematic structure of a display system 1F of a sixth embodiment.

Next, a display system 1F of a sixth embodiment will be described with reference to FIG. 10. FIG. 10 is a schematic view showing a schematic structure of the display system 1F of the sixth embodiment. The display system 1F includes a screen 2, an image projection system 31F, an invisible light projection system 32F and a synthesizing element 34. As the screen 2, any of the screens to which the invention is applied may be adopted.

The image projection system 31F and the invisible light projection system 32F of this embodiment are constructed of projectors independent of each other. The image projection system 31F emits an image light L1 based on image data D1 supplied from a signal source 9. The invisible light projection system 32F emits an address light L2 based on range data D2 supplied from the signal source 9. The image light L1 and the address light L2 are incident on the synthesizing element 34.

The synthesizing element 34 of this embodiment has such a characteristic that visible light is allowed to be transmitted and invisible light is reflected, and is constructed of, for example, a half mirror. The image light L1 incident on the synthesizing element 34 is transmitted through the synthesizing element 34 and is incident on the screen 2. The address light incident on the synthesizing element 34 is reflected by the synthesizing element 34 and the light axis is bent, and the light axis becomes substantially equal to that of the image light L1 transmitted through the synthesizing element 34. The address light L2 reflected by the synthesizing element 34, together with the image light L1, is incident on the screen 2.

In the display system 1F of the structure as described above, since the light axis of the image light L1 and the light axis of the address light L2 are made substantially coincident with each other by the synthesizing element 34, the area on which the address light L2 is incident in the screen 2 can be made correspond to the area on which the image light L1 is incident at high accuracy. By this, the area which is brought into the scattering state in the screen 2 can be made correspond to the area where the image P is displayed at high accuracy.

Seventh Embodiment

Figure 11:
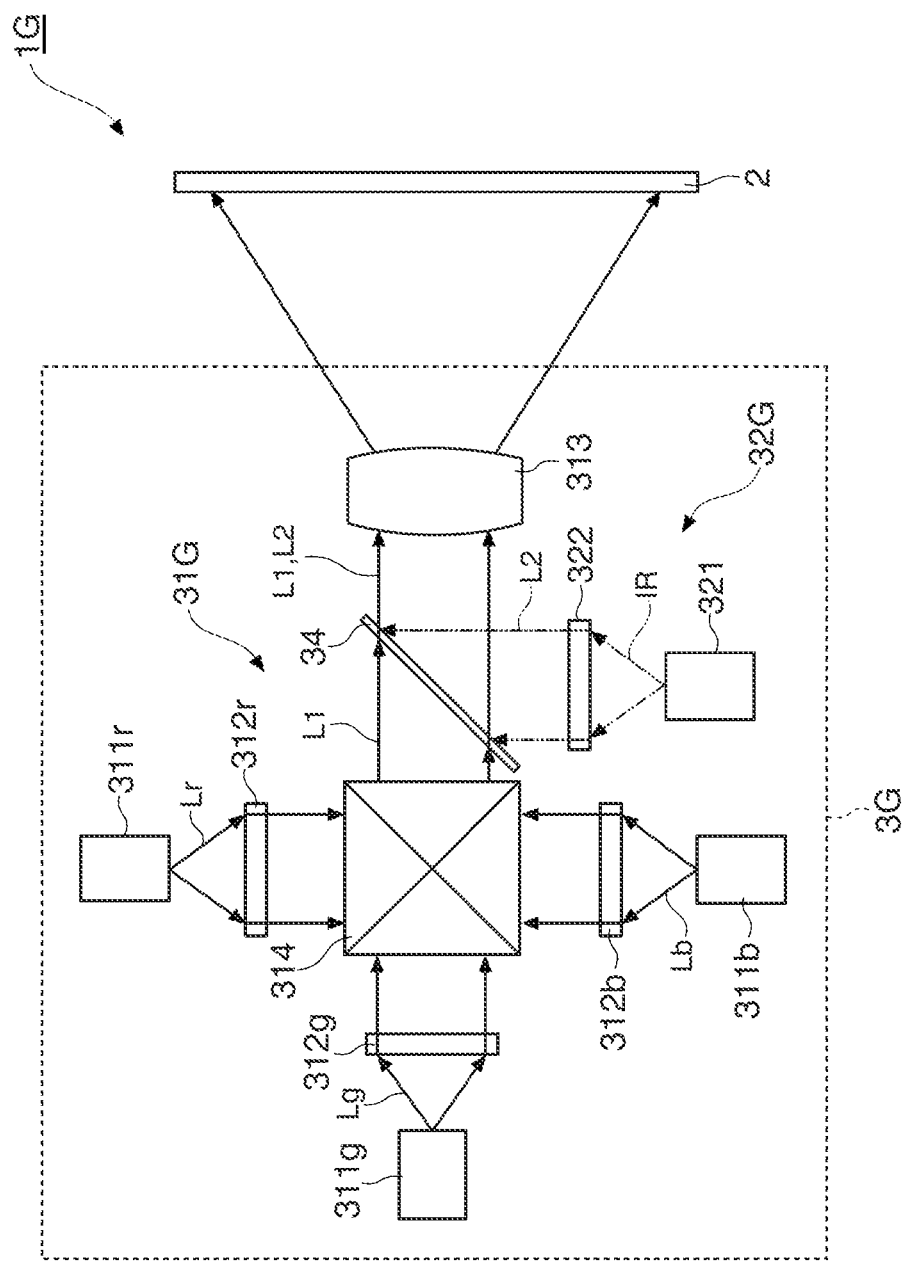
FIG. 11 is a schematic view showing a schematic structure of a display system 1G of a seventh embodiment.

Next, a display system 1G of a seventh embodiment will be described with reference to FIG. 11. FIG. 11 is a schematic view showing a schematic structure of the display system 1G of the seventh embodiment. The display system 1G includes a screen 2 and a projector 3G. As the screen 2, any of the screens to which the invention is applied may be adopted. The projector 3G includes an image projection system 31G, an invisible light projection system 32G and a synthesizing element 34.

The image projection system 31G includes first light source devices 311r, 311g, 311b, first light modulation elements 312r, 312g, 312b and a color synthesizing element 314. Image data is supplied to the image projection system 31G from a signal source. The image data includes data for red, data for green and data for blue.

The first light source device 311r emits a red light Lr, and the first light modulation element 312r modulates the red light Lr based on the data for red. The first light source device 311g emits a green light Lg, and the first light modulation element 312g modulates the green light Lg based on the data for green. The first light source device 311b emits a blue light Lb, and the first light modulation element 312b modulates the blue light Lb based on the data for blue.

The modulated red light Lr, green light Lg and blue light Lb are incident on the color synthesizing element 314 and are synthesized, and the synthesized light becomes an image light L1 corresponding to a full-color image. The color synthesizing element is constructed of, for example, a dichroic prism.

The invisible light projection system 32G includes a second light source device 321 and a second light modulation element 322. Range data is supplied to the invisible light projection system 32G from a signal source. The second light source device 321 emits an infrared light IR, and the second light modulation element 322 modulates the infrared light IR into two gradations based on the range data, and forms an address light L2.

The image light L1 and the address light L2 are incident on the synthesizing element 34. The synthesizing element 34 has such a characteristic that visible light is allowed to be transmitted, and infrared light is reflected. The synthesizing element 34 is constructed of, for example, a dichroic mirror. The image light L1 incident on the synthesizing element 34 is transmitted through the synthesizing element 34 and is projected onto the screen 2 by a projection optical system 313. The address light L2 incident on the synthesizing element 34 is reflected by the synthesizing element 34, the light axis is bent, and the light axis becomes substantially equal to that of the image light L1 transmitted through the synthesizing element 34. The address light L2 reflected by the synthesizing element 34, together with the image light L1, is incident on the projection optical system 313, and is projected onto the screen 2.

In the display system 1G of the structure as described above, since the light axis of the image light L1 and the light axis of the address light L2 are made substantially coincident with each other by the synthesizing element 34, an area where an image P is to be displayed on the screen 2 can be made to correspond to an area which is brought into the scattering state at high accuracy. Since the address light L2 is projected by the projection optical system 313 common to the image light L1, as compared with the structure in which the address light L2 is projected by the projection optical system independent of that of the image light L1, the apparatus structure can be made simple. Besides, it becomes unnecessary to adjust zoom and focus in two projection optical systems, and the area which is brought into the scattering state on the screen 2 can be easily made to correspond to the area where the image P is to be displayed at high accuracy.

Eighth Embodiment

Figure 12:
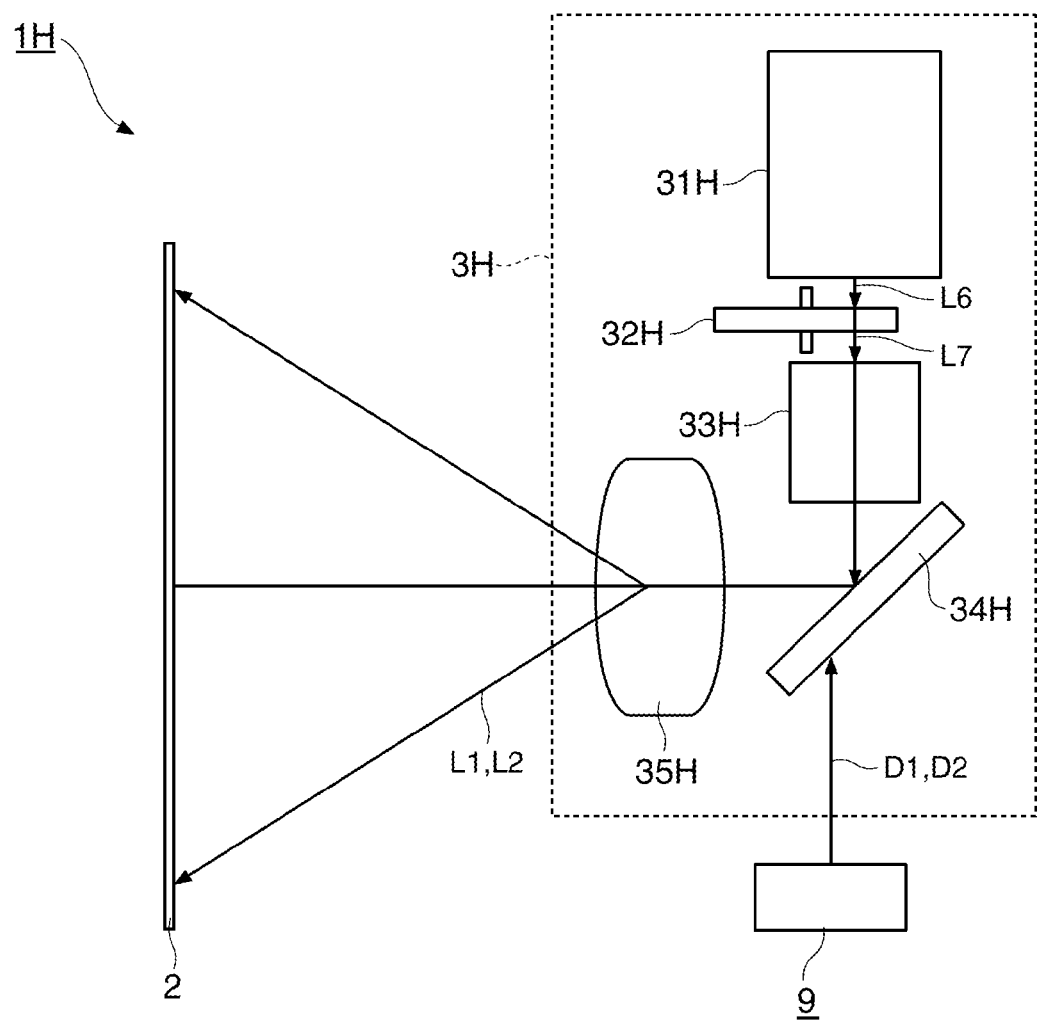
FIG. 12 is a schematic view showing a schematic structure of a display system 1H of an eighth embodiment.
Figure 13A:
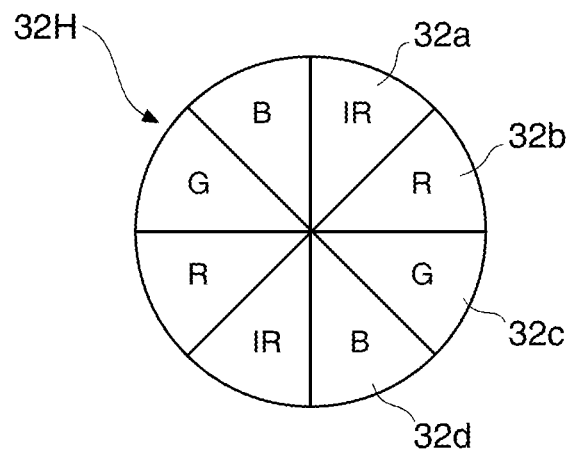
FIG. 13A is a structural view of a color wheel and FIG. 13B is a structural view of a modified example.
Figure 13B:
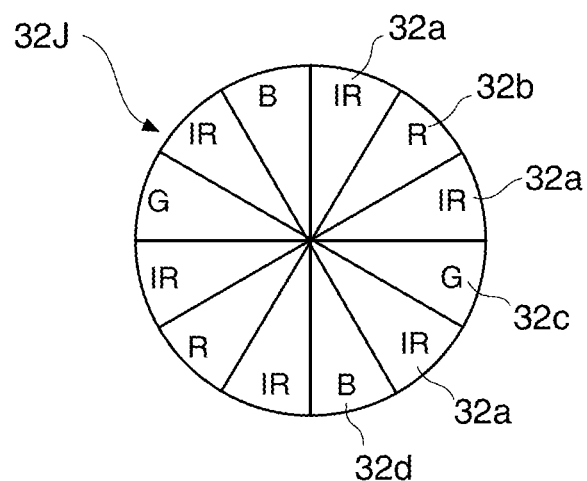

Next, a display system 1H of an eighth embodiment will be described with reference to FIG. 12 and FIGS. 13A and 13B. FIG. 12 is a schematic view showing a schematic structure of the display system 1H of the eighth embodiment, FIG. 13A is a schematic view showing a structure of a color wheel 32H, and FIG. 13B is a schematic view showing a modified example of a color wheel.

As shown in FIG. 12, the display system 1H includes a screen 2 and a projector 3H. As the screen 2, any of the screens to which the invention is applied may be adopted. The projector 3H includes a light source device 31H, a color wheel 32H, an illuminance uniforming element 33H, a light modulation element 34H and a projection optical system 35H.

The light source device 31H emits a light L6 including visible light and infrared light. The light L6 is incident on the color wheel 32H. As shown in FIG. 13A, the color wheel 32H has a substantially disk shape, and is divided into plural fan-shaped portions. Each of the plural fan-shaped portions is a color filter to allow a color light of a specified wavelength band to be transmitted.

Particularly, a color filter 32a through which infrared light is transmitted, a color filter 32b through which red light is transmitted, a color filter 32c through which green light is transmitted, and a color filter 32d through which blue light is transmitted are arranged in this order in the peripheral direction of the color wheel 32H. Here, the four kinds of color filters are arranged in a range of substantially 180 degrees of the color wheel 32H, and four kinds of color filters are again arranged in the remaining range of 180 degrees.

The color wheel 32H is held to be rotatable around an axis at the center of a circle when seen in plain view. The color filter at the position where the light L6 is incident is switched by the rotation of the color wheel 32H. A light L7 emitted from the color wheel 32H is time-sequentially switched in order of infrared light, red light, green light and blue light. The light L7 is incident on the illuminance uniforming element 34H constructed of a rod lens or the like, and after the illuminance distribution is uniformed, the light is incident on the light modulation element 34H.

The light modulation element 34H is constructed of a digital mirror device. Image data D1 and range data D2 are supplied to the light modulation element 34H from a signal source 9. The image data D1 includes data for red, data for green and data for blue. The light modulation element 34H modulates the light L7 and forms an address light L2 based on the range data D2 in a period when the infrared light as the light L7 is incident. The light modulation element 34H forms a red image light based on the data for red in a period when the red light as the light L7 is incident. The light modulation element 34H forms a green image light based on the date for green in a period when the green light is incident, and forms a blue image light based on the data for blue in a period when the blue light is incident. That is, the light modulation element 34H time-sequentially emits the address light L2 and, as an image light L1, the red image light, the green image light and the blue image light.

The image light L1 and the address light L2 emitted from the light modulation element 34H is projected onto the screen 2 by the projection optical system 35H. In the screen 2, an area on which the address light L2 is incident becomes the scattering state, and in the period when the screen 2 is in the scattering state, a red image, a green image and a blue image are time-sequentially displayed. The red image, the green image and the blue image are switched at such a speed that the observer M can not discriminate between them. Since the red image, the green image and the blue image are temporally averaged and observed, a full-color image is displayed.

In the display system 1H of the structure as described above, since the image light L1 and the address light L2 result from the same light source, the light axis of the image light L1 is substantially coincident with the light axis of the address light L2. Accordingly, in the screen 2, the area which is brought into the scattering state can be made to correspond to the area where the image P is to be displayed at high accuracy. The light source device 31H, the light modulation element 34H and the projection optical system 35H can be made common to the image projection system and the invisible light projection system, and the apparatus structure can be made simple.

In the display system 1H of the structure as described above, there can occur a case where the period when the screen 2 is brought into the scattering state by the incidence of the infrared light is insufficient for the period when the red image, the green image and the blue image are displayed. This is because a period when the impedance of the photoconductive layer is lowered has a limit according to the material of the photoconductive layer. In such a case, a color wheel 32J of a modified example as shown in FIG. 13B is adopted.

In the color wheel 32J, a color filter corresponding to visible light and a color filter corresponding to invisible light are alternately arranged. In more detail, a color filter 32a for infrared light, a color filter 32b for red light and a color filter 32a for infrared light are arranged in this order in the peripheral direction of the color wheel 32J, and similarly, in the following, a color filter for green light, a color filter for infrared light, a color filter for blue light, a color filter for infrared light are arranged in this order. When this structure is adopted, since the scattering state has only to be held in the period when an image is displayed by at least one color light of the visible light, it is easy to hold the screen 2 in the scattering state in the period when the image is displayed.

Ninth Embodiment

Figure 14:
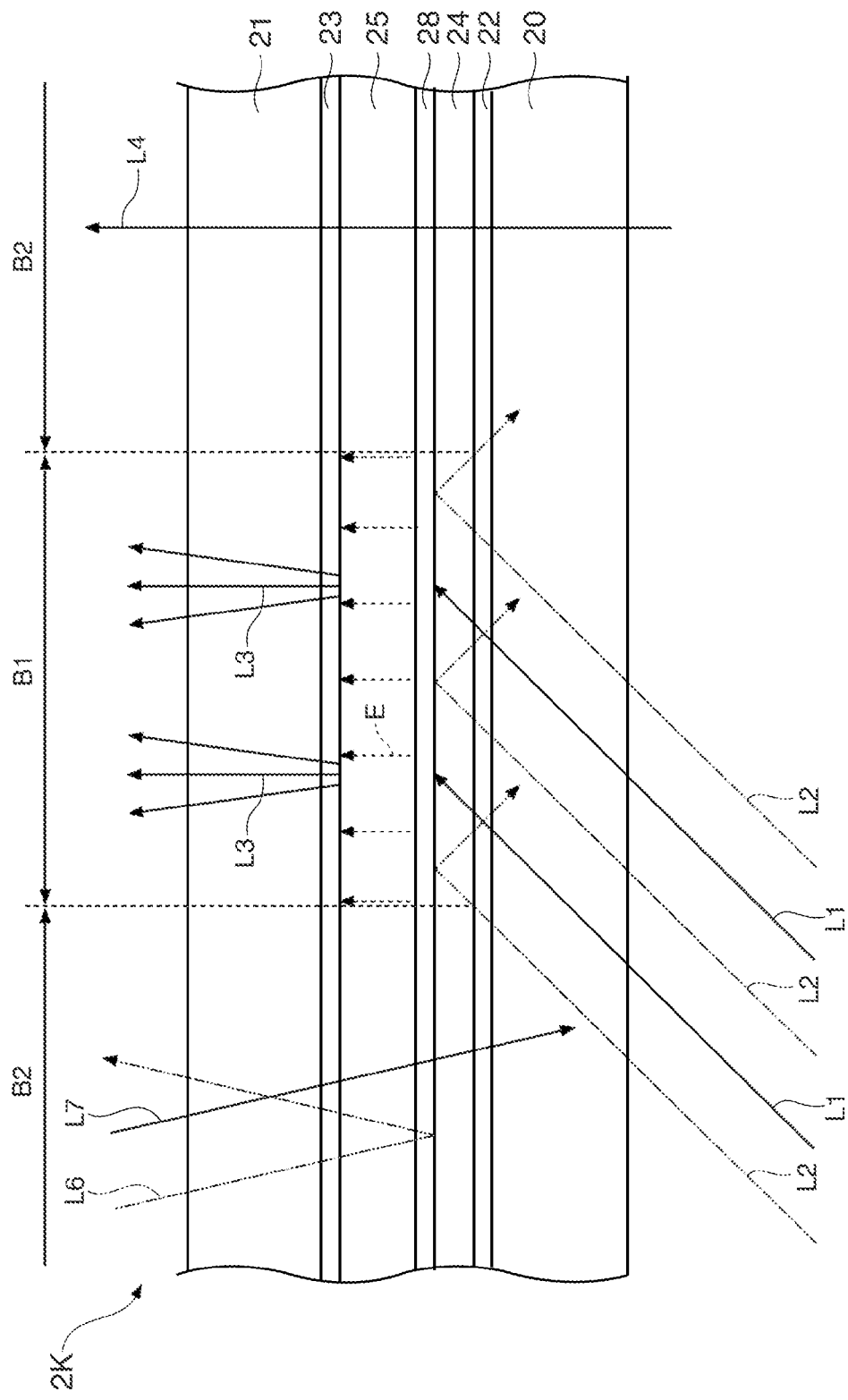
FIG. 14 is a schematic view showing a schematic structure of a screen 2K of a ninth embodiment.

Next, a screen of a ninth embodiment will be described with reference to FIG. 14. FIG. 14 is a schematic view showing a schematic structure of a screen 2K of the ninth embodiment. The screen 2K is different from the screen 2 (see FIG. 4) of the first embodiment in that a wavelength selection film 28 is provided.

The wavelength selection film 28 is arranged at a position where invisible light emitted from an invisible light projection system is incident through a photoconductive layer 24. Here, the photoconductive layer 24 is arranged on the incident side of the invisible light from the invisible light projection system with respect to a PDLC 25, and the wavelength selection film 28 is arranged between the photoconductive layer 24 and the PDLC.

The wavelength selection film 28 has such wavelength selectivity that visible light emitted from a visible light projection system is allowed to be transmitted, and the invisible light emitted from the invisible light projection system is reflected. The wavelength selection film 28 becomes excellent as the reflectance to the invisible light becomes high and as the transmittance to the visible light becomes high.

The wavelength selection film 28 is constructed of a multilayer film in which two or more kinds of films different in refractive index are periodically laminated, or a single layer film. When the wavelength selection film 28 is constructed of a single layer film, the film thickness of the wavelength selection film 28 is adjusted based on the refractive index of the wavelength selection film 28 to a film (here, the photoconductive layer 24) in contact with one surface of the wavelength selection film 28 and the refractive index of the wavelength selection film 28 to a film (here, the PDLC 25) in contact with the other surface of the wavelength selection film 28.

An address light L2 incident on the screen 2K from the invisible light projection system passes through the photoconductive layer 24 and then is reflected by the wavelength selection film 28, and is again incident on the photoconductive layer 24. The impedance of the photoconductive layer 24 in an IR incident area B1 is changed by the address light L2 primarily incident from the invisible light projection system and the address light L2 reflected by the wavelength selection film 28 and secondarily incident.

An image light L1 incident on the screen 2K from a visible light projection system passes through the wavelength selection film 28 in the IR incident area B1 and then is scattered by the PDLC 25 and becomes a scattered light L3. The scattered light L3 is visually recognized by the observer, and an image is displayed.

An external light incident on the wavelength selection film 28 from the opposite side to the photoconductive layer 24 advances as described below. An invisible light L6 included in the external light passes through the PDLC 25, and at least a part thereof is reflected by the wavelength selection film 28. With respect to the invisible light L6 resulting from the external light, the amount of light incident on the photoconductive layer 24 is reduced by the amount of light reflected by the wavelength selection film 28. Accordingly, in the IR non-incident area B2 in which the address light L2 is not incident from the invisible light projection system, it is avoided that the impedance of the photoconductive layer 24 is changed by the invisible light L6 resulting from the external light. A visible light L7 included in the external light passes through the PDLC 25, and most thereof passes through the wavelength selection film 28 and is emitted from a transparent substrate 20 side of the screen 2K.

In the screen 2K of the structure as described above, the impedance change amount of the photoconductive layer 24 per light amount of the address light L2 emitted from the invisible light projection system can be increased, and the output of the invisible light projection system can be reduced. Accordingly, the power consumption of the invisible light projection system 24 can be reduced, and resultantly, the power consumption of the display system can be reduced.

The invisible light L6 resulting from the external light incident on the screen 2K from the opposite side to the photoconductive layer 24 with respect to the wavelength selection film 28 is hard to reach the photoconductive layer 24. Accordingly, in an area (for example, the IR non-incident area B2) on which the invisible light L6 is incident, it is avoided that the screen 2K does not become the desired transmission state or scattering state, and the area which is brought into the transmission state or the scattering state can be controlled at high accuracy.

Since the wavelength selection film 28 is arranged between the PDLC 25 and the photoconductive layer 24, the address light L2 is hard to be incident on the PDLC. By this, it is avoided that the address light L2 is scattered by the PDLC 25 and then is incident on the photoconductive layer 24. The area which is brought into the transmission state or the scattering state can be controlled at high accuracy.

Incidentally, the technical scope of the invention is not limited to the above embodiments. Various modifications can be made within the scope not departing from the gist of the invention. For example, as the screen, instead of the polymer-dispersed liquid crystal layer, a liquid crystal layer driven in a dynamic scattering mode may be used. This liquid crystal layer has, for example, homeotropic orientation (vertical orientation). When a voltage higher than a threshold is applied to the liquid crystal layer, the orientation effect by an electric current to a liquid crystal molecule becomes higher than the orientation effect by an electric field, and an unstable phenomenon in fluid mechanics occurs. This unstable phenomenon is called Carr-Helfrich effect. By this effect, turbulent flow occurs in the liquid crystal layer, and the liquid crystal layer becomes the dynamic scattering state. A voltage applied between the pair of transparent electrodes, the thickness of the photoconductive layer, and the electric characteristic of the photoconductive layer are set so that the liquid crystal layer becomes the dynamic scattering state in the incident area on which the address light is incident. The liquid crystal layer becomes the dynamic scattering state in the incident area of the address light, so that the input area is switched from the transmission state to the scattering state.

The photoconductive layer may be arranged on the emission side of the invisible light with respect to the polymer-dispersed liquid crystal layer, for example, between the transparent electrode 23 shown in FIG. 3A and the polymer-dispersed liquid crystal layer 25. Besides, the photoconductive layer may be arranged at both sides of the polymer-dispersed liquid crystal layer 25. In the photoconductive layer, the area where the impedance is changed by the incidence of the address light can extend to the outside of the area on which the address light is actually incident. In order to make the non-display area transparent at high position accuracy, the IR incident area is set in view of the extension of the area where the impedance is changed. For example, when the address light is projected onto the display area, since the area where the impedance is reduced extends to the outside of the display area, the area onto which the address light is projected may be set to be narrower than the display area by the amount of extension.

The image projection system may be arranged on the opposite side to the observer with respect to the screen, or may be arranged on the observer side. When the image projection system is arranged on the observer side with respect to the screen, the image is displayed by the image light reflected and scattering by the screen.

Various edge detection processes are performed on the input image data D0, and detected edges may be acquired as the range data. The edge detection processes include, for example, a process of detecting the edge of a display object from a difference between an input image including the display object to be displayed as an image P and an input image not including the display object, and a pattern identification process used for a face recognition system.

A partial image extracted from the original image in the signal source 9 or the like may be supplied as the input image to the projector. In this case, the image extraction section 302 can be omitted. Besides, data indicating the whole image may be inputted to the image projection system, and also in this structure, the effect that the screen itself becomes hard to be recognized can be obtained. Besides, the image light corresponding to the area except the partial image in the whole image is hardly scattered, passes through the screen, and is hard to be recognized as a pattern. Especially, when the image projection system is arranged outside the viewing angle range through the screen 2, the image light of the area except the partial image in the whole image is hard to be incident on the eyeball of the observer, and the area except the partial image can be made not to be recognized.

What is claimed is:

1. A display system comprising:
   a screen in which, in an area on which invisible light is incident, a scattering state where visible light is scattered and a transmission state where visible light is transmitted are switched;
   an image projection system to project an image of the visible light onto the screen; and
   an invisible light projection system to project the invisible light onto the screen and to cause an area of the screen onto which a desired portion of the image is projected to have the scattering state,
   wherein the screen includes:
     a pair of transparent electrode;
     a polymer-dispersed liquid crystal layer arranged between the pair of transparent electrodes; and
     a photoconductive layer which is arranged between at least one of the pair of transparent electrodes and the polymer-dispersed liquid crystal layer and impedance of which is changed by incidence of the invisible light,
   wherein the screen includes a light absorption layer to absorb a complementary light which has a complementary color in subtractive color mixing with respect to a color light absorbed in the photoconductive layer.

* * * * *